United States Patent
Boudry et al.

(10) Patent No.: US 7,758,084 B2
(45) Date of Patent: Jul. 20, 2010

(54) CONNECTION BETWEEN A PIPE AND A WALL

(75) Inventors: John Alexandre Boudry, Brettenham (GB); Nicholas John Metcalf, Ipswich (GB)

(73) Assignee: Petrotechnik Limited (GB)

( * ) Notice: Subject to any disclaimer, the term of this patent is extended or adjusted under 35 U.S.C. 154(b) by 807 days.

(21) Appl. No.: 10/596,042

(22) PCT Filed: Dec. 25, 2004

(86) PCT No.: PCT/GB2004/004949

§ 371 (c)(1),
(2), (4) Date: Jun. 29, 2006

(87) PCT Pub. No.: WO2005/052428

PCT Pub. Date: Jun. 9, 2005

(65) Prior Publication Data

US 2007/0057504 A1 Mar. 15, 2007

(30) Foreign Application Priority Data

| Nov. 25, 2003 | (GB) | 0327301.8 |
| Jan. 13, 2004 | (GB) | 0400665.6 |
| Jan. 21, 2004 | (GB) | 0401274.6 |
| Feb. 18, 2004 | (GB) | 0403602.6 |
| Sep. 10, 2004 | (GB) | 0420132.3 |

(51) Int. Cl.
*F16L 41/00* (2006.01)

(52) U.S. Cl. .................. 285/139.3; 285/21.2; 285/139.2

(58) Field of Classification Search .............. 285/21.2, 285/139.1, 139.2, 139.3, 141.1, 142.1
See application file for complete search history.

(56) References Cited

U.S. PATENT DOCUMENTS

| 985,853 | A | * | 3/1911 | Stewart | 285/139.1 |
| 2,793,830 | A | * | 5/1957 | Nakaji et al. | 251/147 |
| 2,992,018 | A | * | 7/1961 | Rosan | 285/81 |
| 3,353,849 | A | * | 11/1967 | Laurizio | 285/21.2 |
| 3,749,424 | A | * | 7/1973 | Greene | 285/139.1 |
| 4,697,831 | A | | 10/1987 | Thalmann | 285/174 |
| 4,828,296 | A | * | 5/1989 | Medvick | 285/139.1 |
| 5,704,656 | A | * | 1/1998 | Rowe | 285/139.3 |
| 5,799,988 | A | * | 9/1998 | Yeh | 285/139.1 |
| 5,967,567 | A | * | 10/1999 | Nordstrom | 285/139.1 |
| 6,883,836 | B2 | * | 4/2005 | Breay et al. | 285/189 |
| 7,121,589 | B2 | * | 10/2006 | Hawkinson et al. | 285/139.2 |

FOREIGN PATENT DOCUMENTS

| EP | 1038140 | 9/2000 |
| GB | 2383827 | 7/2003 |
| WO | WO03/029710 | 4/2003 |
| WO | WO2004/031640 | 4/2004 |
| WO | WO2004/079245 | 9/2004 |

* cited by examiner

*Primary Examiner*—David E Bochna
(74) *Attorney, Agent, or Firm*—Hayes Soloway P.C.

(57) ABSTRACT

A fitting (22) for providing a substantially fluid-tight seal between an opening in a chamber wall (10) and a pipe passing through said opening, said fitting (22) comprising: a first portion (31) adapted to extend through the opening in the chamber wall and; a second portion (32) adapted to form a fluid-tight fit with the first portion (31), both the first portion (31) and the second portion (32) being adapted to allow the pipe to pass therethrough; characterized in that the first portion (31) is formed from a material adapted to bond to a fiber reinforced plastics material and that the second portion (32) is formed from an electrofusible polymeric plastics material.

25 Claims, 16 Drawing Sheets

SCRAP VIEW SHOWING EXTERNAL FLANGE DETAILS

CONNECTION BETWEEN A PIPE AND A WALL

FIELD OF THE INVENTION

This invention relates to fittings for providing a seal between a wall and a pipe passing through an opening in the wall, to a method of providing such a seal, and to an assembly comprising the combination of a pipe, a wall and a fitting providing a seal between the two. The invention is particularly applicable to the provision of a seal between a pipe and a wall of a manhole chamber as found in a subterranean fuel tank or between a pipe and the wall of sump for a dispensing pump, for example in a petroleum forecourt installation, and in particular where the wall of a chamber or sump is made of glass reinforced plastic (GRP).

BACKGROUND TO THE INVENTION

Subterranean piping systems of the type that are typically installed at service stations are generally utilized to communicate fuel or chemicals between an underground storage tank and an above ground dispensing station. The underground storage tanks and associated piping pose serious potential environmental and fire hazards as the chemicals contained therein could and have in the past leaked into the earth.

Oil companies have been under considerable pressure to ensure that environmental concerns are given priority in the planning and installation of petrol station infrastructures. This has not been without significant on-cost. One important advancement has been the use of pipeline systems constructed from plastics materials which have enabled the oil companies to install cost-effective environmentally acceptable alternatives to steel pipework systems which tend to corrode over time.

Moreover, over recent years there have been major developments in fuel technology which have culminated in commercially available alternative fuels containing additives which have replaced lead-based antiknock compounds. Research also continues to centre on reducing sulphur content and hazardous emissions from fuel. In order to eliminate lead and sulphur from fuels, exotic additives and octane enhancers such as MTBE (methyl tertiary butyl ether) have been developed which are based on complex organic or heavy metal organic additives.

The presence of these additives in fuel can give rise to major environmental issues. Some such issues are described in an article entitled "MBTE—How should Europe Respond", in Petroleum Review February 2000 pages 37-38. The entire text of this article is incorporated herein by reference by way of background information. The authors conclude that lead and some other metals are the most effective octane enhancers. However, lead is in the final stages of being phased out because of environmental and health issues, and the most readily available alternative, MMT (methylcyclopentadienyl manganese tricarbonile) is currently not widely accepted. The only other octane enhancers currently available are MTBE and other ethers such as ethyl tertiary butyl ether (ETBE) and tertiary amyl methyl ether (TAME), or alcohols such as ethanol. The ethers all tend to have similar properties and drawbacks. Ethanol is already used as a gasoline-blending component in parts of the United States where it is readily available, and in Brazil. It is an effective octane booster but has a number of drawbacks: it needs a "water-free" distribution system and is not without ground water issues. It is currently not recommended by the motor industry and is not cost-competitive.

The introduction of new fuel mixtures and esoteric additives has led oil companies to question whether existing pipeline systems can cope with the new fuels with regards to mechanical performance and permeability resistance. In some instances this will result in the pipework having to be replaced by pipework made from a more resistant material, with all the disruption that entails.

In petroleum forecourt installations, pipework running between dispensing pumps and a subterranean fuel storage tank passes into a manhole chamber which is situated directly above the manhole lid of the tank. The chamber is normally defined by an upstanding wall which, when viewed from above, can be of an octagonal, square, circular or rectangular shape, and which includes apertures through which respective pipes pass.

To overcome environmental concerns this pipework is now generally constructed from plastics materials and many current designs of forecourt installation utilise secondary containment. This involves containing each fuel supply pipeline in a respective secondary containment pipeline which is optionally sealed at its ends to the fuel supply pipeline. The secondary containment pipeline prevents leaks from the fuel supply pipeline from being discharged into the environment, and also can convey leaked petrol to a remote-sensing device. Typically, the pipes forming the secondary containment pipeline are initially separate from the fuel pipes and are sleeved over the latter as the fuel pipes are installed between the fuel storage tanks and dispensing pumps.

A common material for the chamber to be constructed from is glass-reinforced plastic or, more generally fibre-reinforced plastic (FRP), which involves moulding a resin or other polymeric material reinforced with fibres such as glass fibres.

It is desirable to provide a seal between each of the apertures and its respective pipe to avoid ingress of water into the manhole chamber. To that end, it is known to attach a fitting to a portion of the wall around the aperture and a rubber "boot" that sleeves over the pipe and is clamped to both the pipe and the fitting by, for example, Jubilee™ clips. Some types of such fitting are bolted to the chamber wall, whilst other types of fitting provide inner and outer parts between which the wall is sandwiched, the inner and outer parts being held together by a screw-threaded connector which extends through the aperture. These connectors often incorporate a rubber seal located between a part of the connector and the chamber wall.

Neither type of fitting provides a completely effective seal.

Over time, both types of seal can allow water to leak into the manhole chamber and to accumulate in a pool in the bottom of the chamber. This in turn makes the maintenance of the chamber bottom and tank entrance extremely difficult. In addition a defective seal can allow any petroleum fluid or vapours which find their way into the chamber to escape into the environment.

It would be preferable if such a fitting could be chemically bonded or electrofusion welded both to the pipe and to the chamber wall. One type of such fittings, manufactured from a plastics material capable of electrofusion to both the pipe and the chamber wall is known from GB2332255 (PetroTechnik Ltd). However, these fittings cannot be used when the chamber is constructed from GRP, a material commonly used in construction of chambers and sumps for this application.

In summary therefore, in the event that pipework has to be replaced, or in new build situations, there is a requirement to seal pipework made from polyethylene, polypropylene, polyamide or the like to a GRP chamber wall. Accordingly it is an object of the present invention to provide a fitting for forming a seal between pipework formed from a plastics materials and a GRP chamber which overcomes some or all of the above disadvantages.

SUMMARY OF THE INVENTION

According to the present invention there is provided a fitting according to claim 1. By way of one embodiment there is provided a fitting for providing a substantially fluid-tight seal between an opening in a chamber wall and a pipe passing through said opening, said fitting comprising:

(i) a first portion adapted to extend through the opening in the chamber wall and;

(ii) a second portion adapted to form a fluid-tight fit with the first portion, both the first portion and the second portion being adapted to allow the pipe to pass therethrough;

characterized in that the first portion is formed from a material adapted to bond to a fibre reinforced plastics material and that the second portion is formed from an electrofusible polymeric plastics material.

By forming a first part of the fitting from a fibre-reinforced plastic and a second part of the fitting from a plastics material electrofusible to the pipework, a strong, long-lasting fluid-tight seal can be formed between the fitting and both the chamber wall and the pipe.

Preferably the first and second portions of the fitting overlap for a proportion of their length, the fluid-tight seal between the two portions being formed in that overlapping region.

In a particularly preferred embodiment the first portion further comprises a flange, extending radially outwardly from the body of the first portion, a first surface of the flange being configured to contact the chamber wall around substantially the whole circumference of the opening.

Preferably the fitting further comprises a sealing means located between the first and the second portions, said sealing means being adapted to form a fluid-tight seal between the two overlapping portions. The sealing means may comprise an O-ring or a bead of sealant seated in a circumferential channel around one or other of the portions.

Preferably the fitting further comprises an inner tubular portion in the form of a tubular sleeve, formed from a metal, and adapted to fit tightly inside the fitting in the region in which the first and second portions overlap.

Preferably the first portion and the inner tubular portion, if present, is formed from GRP or a metal such as stainless steel, coated steel, aluminium, brass or a polymer resistant to fuel.

In a preferred embodiment the fitting further comprises a third portion adapted to form a substantially fluid-tight seal with the first portion, the third portion being formed from an electrofusible polymeric plastics material.

Preferably the first and third portions overlap for a proportion of their length, the fluid-tight seal between the two portions being formed in that overlapping region.

Preferably said first portion is adapted to accommodate one or more radially extending flanges, said flange(s) being adapted to engage with the chamber wall around substantially the entire circumference of the flange.

Preferably one flange is formed integrally with the first portion.

In addition, or in the alternative, one flange is attached to the first portion by a flange securing means.

Preferably said flange securing means comprises complementary screw threads on the flange and on the outer body of the first portion.

Alternatively said flange securing means comprises a bayonet fixing.

In a further alternative the flange is a tight sliding fit over the first portion and the flange securing means comprises an adhesive.

In a preferred embodiment the second portion incorporates heating windings such that the second portion may be electrofused to a pipe or other item formed from an electrofusible polymeric plastics material. If present the third portion may incorporate heating windings such that the third portion may also be electrofused to a pipe or other item formed from an electrofusible polymeric plastics material.

In a particularly preferred embodiment said fitting further comprises a cover adapted to cover said flange and to encapsulate said flange in an adhesive.

According to a further embodiment of the invention there is provided a fitting for providing a substantially fluid tight seal between an opening in a chamber wall and a pipe passing through said opening, said fitting comprising:

(i) a first tubular sleeve adapted to pass through the opening in the chamber wall and;

(ii) a second tubular sleeve adapted to form a fluid tight fit with the first tubular sleeve, both the first tubular sleeve and the second tubular sleeve being adapted to allow the pipe to pass therethrough;

characterised in that the material of the first tubular sleeve is formed from a fibre reinforced plastics material and that the material of the second tubular sleeve is formed from an electrofusible polymeric plastics material.

By forming a first part of the fitting from a fibre-reinforced plastic and a second part of the fitting from a plastics material electrofusible to the pipework, a strong, long-lasting fluid-tight seal can be formed between the fitting and both the chamber wall and the pipe.

Preferably the first and second tubular sleeves overlap for a proportion of their length, the fluid-tight seal between the two sleeves being formed in that overlapping region.

Preferably the first tubular sleeve further comprises a flange, extending radially outwardly from the sleeve, a first surface of the flange being configured to contact the chamber wall around substantially the whole circumference of the opening.

Preferably the fitting further comprises a sealing means located between the first tubular sleeve and the second tubular sleeve, said sealing means being adapted to form a fluid-tight seal between the two overlapping sleeves.

In a particularly preferred embodiment the sealing means takes the form of an O-ring seal seated in a circumferential channel around one or other of the sleeves.

In a further preferred embodiment the fitting further comprises a third tubular sleeve, formed from a metal, and adapted to fit tightly inside the fitting in the region in which the first and second tubular sleeves overlap.

Preferably the third tubular sleeve is formed from stainless steel, coated steel or a polymer resistant to fuel.

It will be appreciated that the present invention also extends to encompass underground pipework systems including such fittings, and to garage forecourt systems incorporating them.

According to a further embodiment of the present invention there is provided a fitting for providing a substantially fluid-tight seal between an opening in a chamber wall and a pipe passing through said opening, said fitting comprising:

(i) a first portion comprising a first tubular sleeve adapted to form a tight sliding fit with the outside of said pipe, the first portion further incorporating a radially extending first flange adapted to engage with the chamber wall around substantially the entire circumference of the first flange, the first portion further incorporating a second tubular portion extending away from the flange;

(ii) a second portion incorporating a second radially extending flange adapted to engage with the chamber wall around substantially the entire circumference of the second flange;

(iii) securing means adapted to secure the first portion to the second portion.

This arrangement enables the chamber wall to be clamped between the first and second flanges. GRP resin or other adhesive can be used on the face of one or both flanges in order to obtain a long-lasting waterproof seal between the flanges and the chamber wall(s).

Preferably the first tubular sleeve is formed from an electrofusible plastics material.

In a particularly preferred embodiment the inner surface of the first tubular sleeve incorporates heating windings. It is thus possible to electrofuse the first tubular sleeve to the pipe passing through it in use to form a fluid-tight seal between the fitting and the pipe, which could be primary or secondary in construction.

Preferably the first tubular sleeve and the first flange are formed from different materials with a substantially fluid-tight joint there between. In this way, the first flange can be formed from a material that bonds readily to GRP whilst the first tubular sleeve can be formed from a plastics material which is electrofusible to the pipe. Such flange materials include metals such as stainless steel, coated steel, aluminium, coated aluminium or GRP itself or a plastics material that bonds satisfactorily to GRP.

Preferably the first flange and the second flange are formed from substantially the same material.

In a particularly preferred embodiment the securing means comprises complementary screw threaded regions on the first and second portions such that the two portions screw together, clamping the chamber wall(s) between the first and second flanges.

In a further preferred embodiment the first tubular sleeve is formed from polyethylene and the flanges are formed from stainless steel, coated steel or a polymer resistant to fuel.

It will be appreciated that the present invention also extends to encompass underground pipework systems including such fittings, and to garage forecourt systems incorporating them, methods for manufacturing such fittings and methods of forming a fluid-tight seal using such fittings.

According to a still further embodiment of the present invention there is provided a fitting for providing a substantially fluid-tight seal between an opening in a chamber wall and a secondarily contained pipe assembly comprising a primary, supply pipe contained within a secondary pipe, said pipe assembly passing through said opening, said fitting comprising:

(i) a first portion adapted to form a tight sliding fit with said secondary pipe, said first portion incorporating heating windings;

(ii) a second portion adapted to accommodate one or more radially extending flanges, said flange(s) being adapted to engage with the chamber wall around substantially the entire circumference of the flange;

(iii) a third portion adapted in a first region to form a tight sliding fit with said secondary pipe and in a second region adapted to form a tight sliding fit with a primary pipe, said first and second regions incorporating heating windings.

Whilst the fitting described in the embodiment above provides heating elements adapted to form an electrofusion weld to the primary pipe, as well as to the secondary pipe, it will be appreciated that the heating elements serving to form a seal with the primary pipe can be omitted, and replaced by a conventional rubber boot. Such sealing boots are well known and typically provide a valve for monitoring the integrity of the interstitial space between the primary and secondary pipes.

Preferably the flanges are secured to the second portion by securing means.

Preferably the second portion accommodates two flanges.

In an alternative embodiment, one of the flanges can be an integral part of the second portion and the second flange, if present, is secured to the second portion by a securing means.

More preferably the securing means comprises of complementary screw threaded regions on an outer surface of the second portion and an internal diameter of said flange(s).

Preferably two flanges are used which clamp, in use, on either side of the chamber wall.

In a particularly preferred embodiment the chamber is a double walled chamber.

More particularly the chamber maintains an interstitial space between the walls.

Preferably the first and third portions are formed from an electrofusible plastics material.

In a particularly preferred embodiment the heating windings are incorporated in the inner surface of the first and third portions. It is thus possible to electrofuse the first and third portions to the pipe assembly passing through the fitting in use to form a fluid-tight seal between the fitting and the secondarily contained pipe.

Preferably the second portion is formed from a different material from the first and third portions with a substantially fluid-tight joint there between. In this way, the second portion can be formed from a material that forms a tight seal with the flange(s) whilst the first and third portions can be formed from a plastics material which is electrofusible to the pipe. The flange(s) can be formed from a material that bonds readily to the chamber wall. Such suitable flange materials include metals such as stainless steel, coated steel, aluminium, coated aluminium, GRP, a plastics material or a polymer resistant to fuel. A resin or other adhesive can be used on the face of one or both flange(s) in order to obtain a long-lasting waterproof seal between the flange(s) and the chamber wall(s).

Preferably if there is more than one flange they are formed from substantially the same material.

In a preferred embodiment the integrity of the seal may be tested by monitoring the space formed between the inner surface of the second portion and the outer surface of the secondary pipe.

In a particularly preferred embodiment the integrity of the seal may be monitored via the interstitial gap of a secondarily contained wall, an aperture through the body of the second portion being provided for this purpose.

More preferably the integrity of the seal is monitored by connecting the space formed between the inner surface of the second portion and the outer surface of the secondary pipe and the interstitial gap via a passage.

In an alternative embodiment the space formed between the inner surface of the second portion and the outer surface of the secondary pipe is monitored via a test point valve.

BRIEF DESCRIPTION OF THE DRAWINGS

The present invention will now be described by way of examples only with reference to the accompany drawings wherein.

Figure 15:
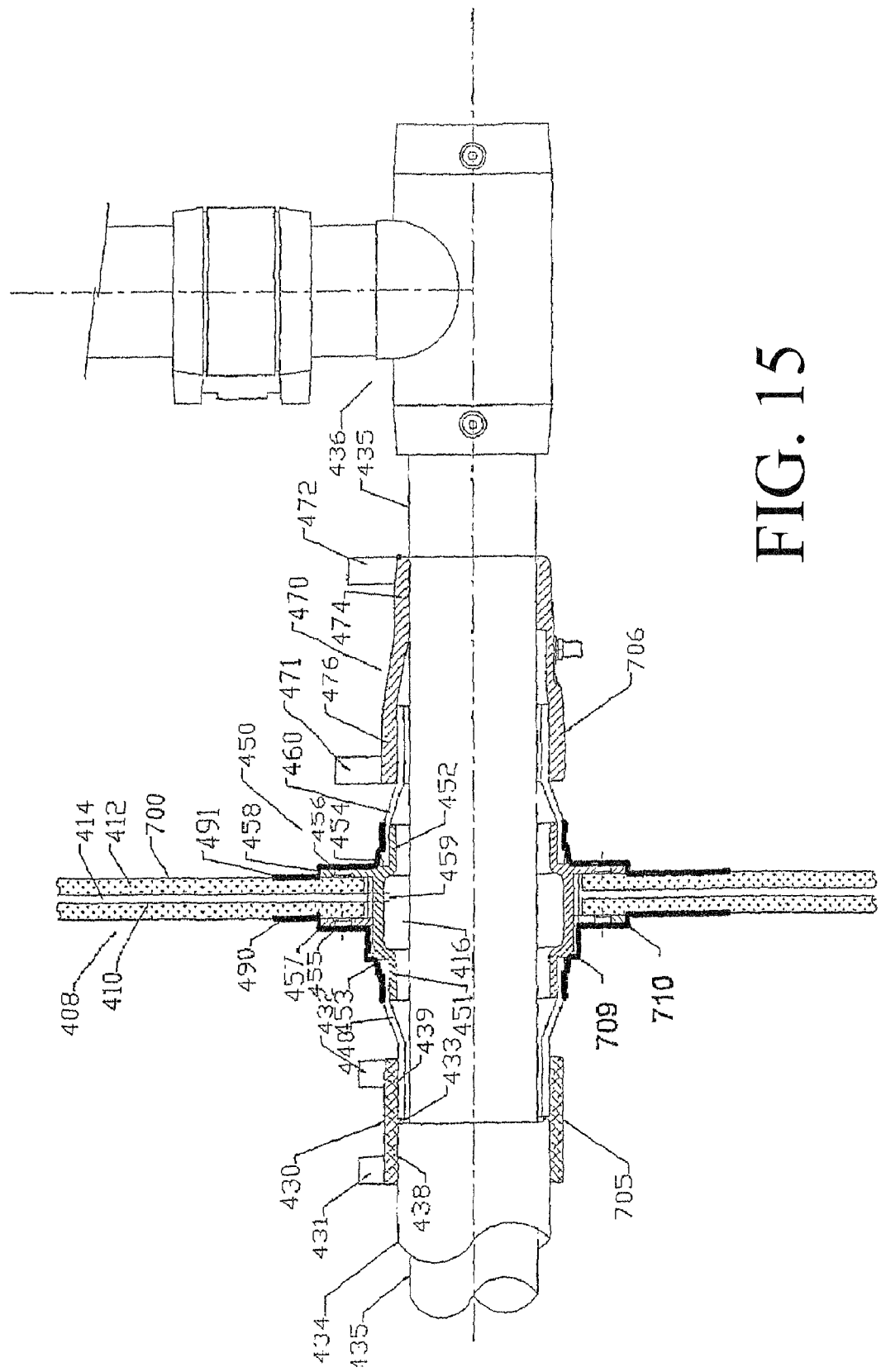
FIG. 15 illustrates a cross-section through a fitting according to a further embodiment.
Figure 16:
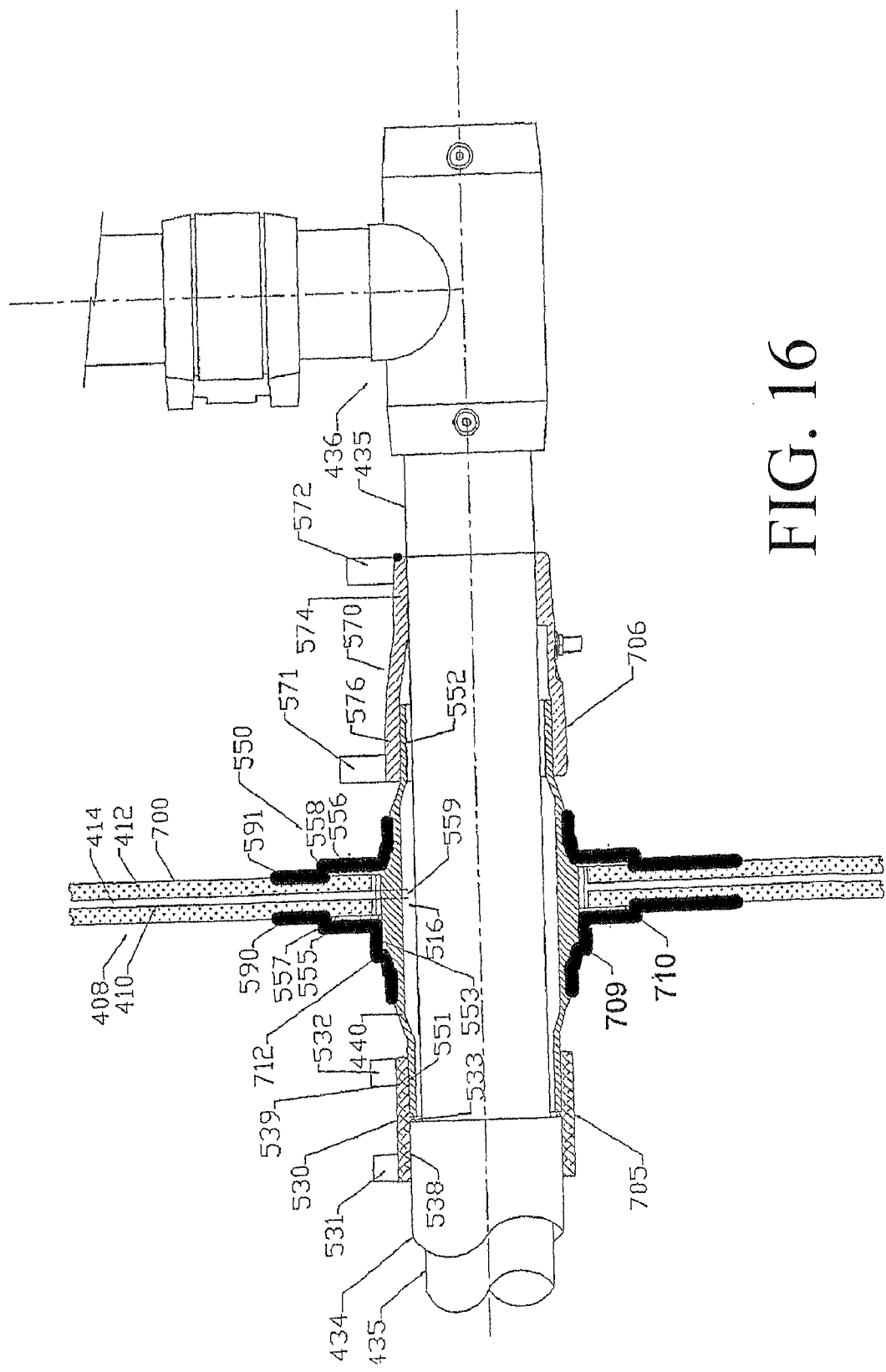
FIG. 16 illustrates a cross-section through a fitting according to yet another embodiment.
Figure 17:
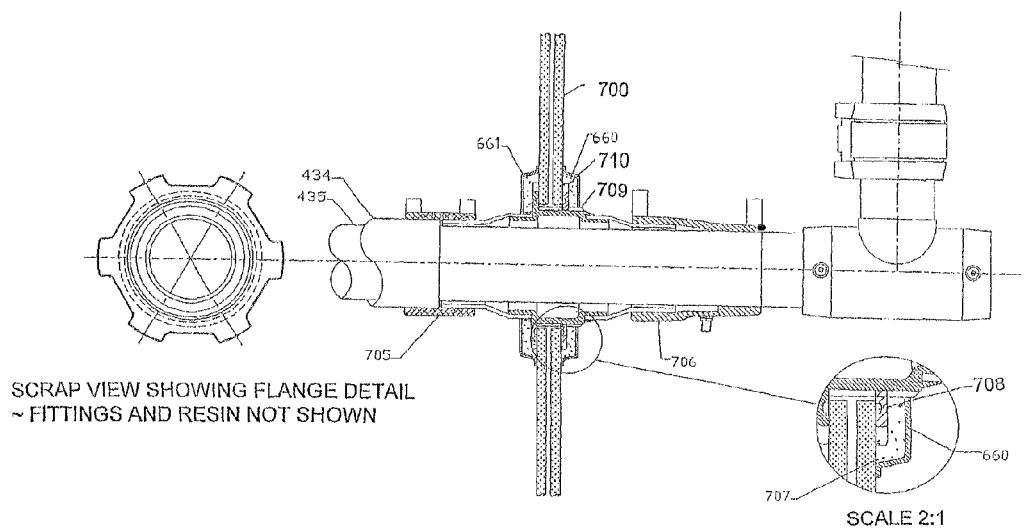
FIG. 17 illustrates the embodiment of FIG. 15 with covers over the flanges to encapsulate them in resin.

The dimensions provided in FIGS. 15, 16 and 17 are by way of example only. Those skilled in the art will appreciate that the embodiments described herein may be made in a variety of shapes and sizes.

DESCRIPTION OF THE PREFERRED EMBODIMENTS

The present embodiments represent currently the best ways known to the applicant of putting the invention into practice. But they are not the only ways in which this can be achieved. They are illustrated, and they will now be described, by way of example only. By way of terminology used in this document the following definitions apply:

chamber—any receptacle designed to keep a fluid in or out. This includes, but is not limited to, manhole and sump chambers as described herein. It also includes tanks in general.

energy transfer means—a generic term describing any form of energy source. Typically it takes the form of a resistance winding which heats up when an electrical current is passed through it. The term also encompasses other welding techniques including ultrasonic welding and induction welding.

flange—any collar suitable for attaching a fitting to a chamber wall. In the examples given the surface of the flange which contacts the chamber wall is substantially planar. However, it will be understood that the flange must conform to the profile of the chamber wall around the pipe inlet opening. Thus the flange can adopt any suitable conformation to achieve the necessary contact with a flat or curved surface or even the corner of a container wall.

fluid—whilst the examples provided relate mainly to liquids, the term fluid refers to liquids, vapours and gases. For example, should a leak occur in a secondarily contained pipe in a garage forecourt installation then petrol or petrol vapour will collect in the manhole chamber. It is essential that this petrol vapour cannot escape through the wall of the chamber and into the surrounding ground.

pipe—the examples given herein are for a generally circular cross-sectioned single wall pipe. However, the invention also covers other cross-sections such as box sections, corrugated and the like and secondarily contained pipes of the "pipe-within-a-pipe" type. In this case the sealing member or boot for sealing the sleeve to the pipe will be rather more complex. However, such boots are well known in the art. The invention also encompasses pipes which are not circular in cross-section.

tubular sleeve—this term has a very broad meaning. It includes any tubular structure through which a pipe may pass. Although illustrated and described as substantially circular cylindrical in form, a sleeve according to this invention need not have a substantially circular cross-section and may confirm to the profile of the pipe to be accommodated in it. Nor need the cross-section of the sleeve be uniform along its whole length, i.e. it need not be cylindrical.

Glass reinforced plastic (GRP)—The term GRP has a very broad meaning in this context. It is intended to encompass any fibre-reinforced plastic (FRP) wherein a fibre of any type is used to strengthen a thermosetting resin or other plastics material.

Figure 1:
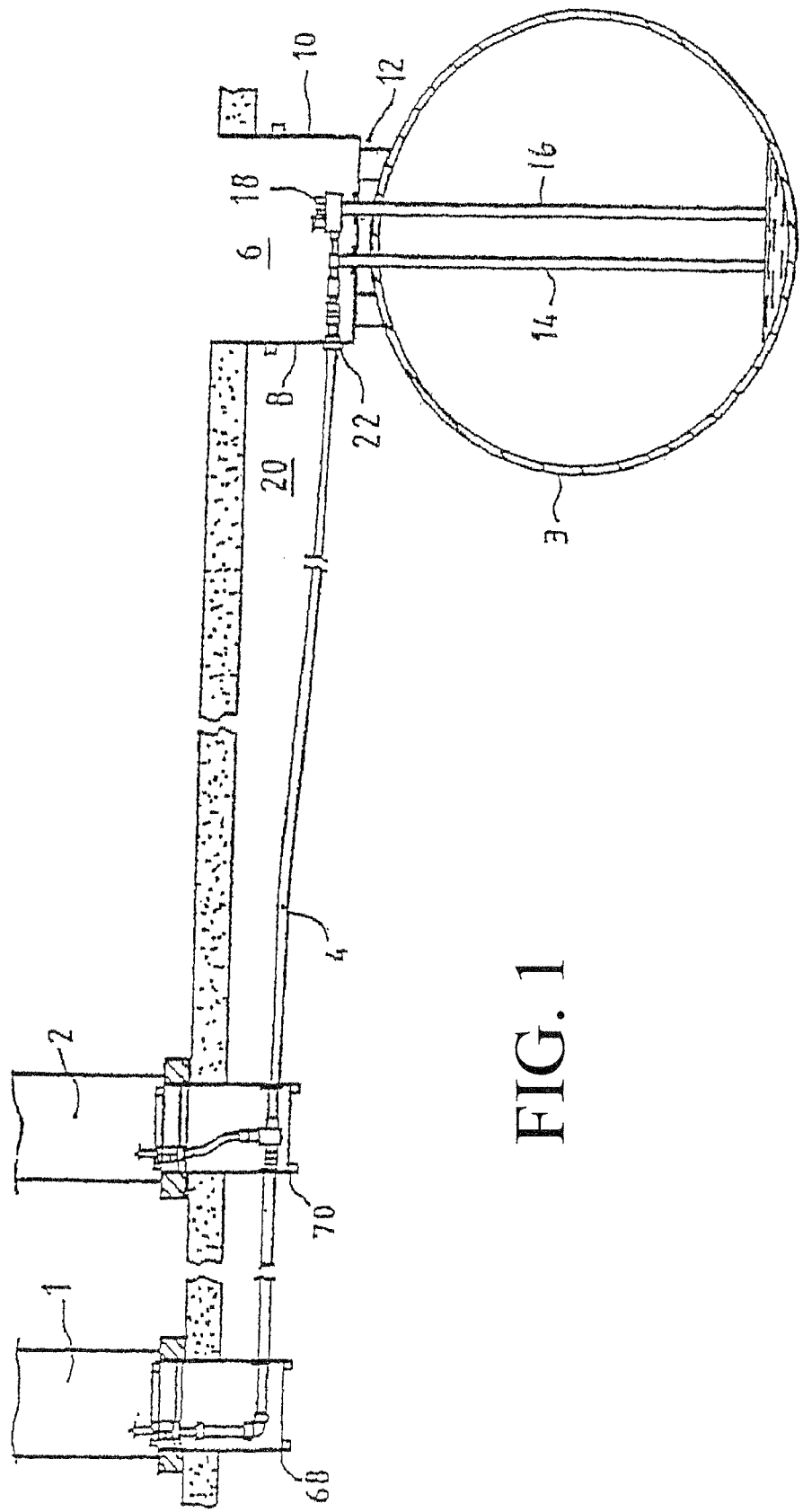
FIG. 1 is a partially cut-away side view of part of a petroleum forecourt installation which includes a tank having a manhole chamber, having a fitting in accordance with the invention.

The petroleum forecourt installation shown in FIG. 1 comprises a pair of dispensing pumps 1 and 2 connected to a subterranean tank 3 through a pipeline 4. The pipeline 4 is formed from contiguously arranged sections of polyethylene pipe. The pipeline 4 extends from the pumps 1 and 2 into a manhole chamber 6 immediately above the tank 3. The chamber 6 is defined by a GRP member 8 having a sidewall 10 and a base 12.

FIG. 1 shows two lines extending from the pipeline 4 into the tank 3. These lines relate to two alternative forms of fuel supply system and are both shown for the sake of completeness. In practice, only one of the lines would extend from the pipeline 4 into the manhole chamber 6. One of those lines is a suction line 14 which is used where the dispensing pumps 1 and 2 are fitted with suction pumps. The alternative line, reference 16, is a pressure line connected to the pipeline 4 via a pump 18 which is operable to propel fuel from the tank 3 to the pumps 1 and 2.

It can be seen from FIG. 1 that the wall 10 has to be apertured in order to allow the pipeline 4 to pass into the chamber 6. In order to prevent water leaking from the surrounding ground (here denoted by reference numeral 20) into the chamber 6 through the aperture, the pipe is sealed to the cylindrical wall 10 by means of a fitting 22 shown in more detail in FIGS. 2 to 16 inclusive. In the event of a spillage or a leak in a supply pipe the seal also prevents fuel from escaping into the environment.

Figure 2:
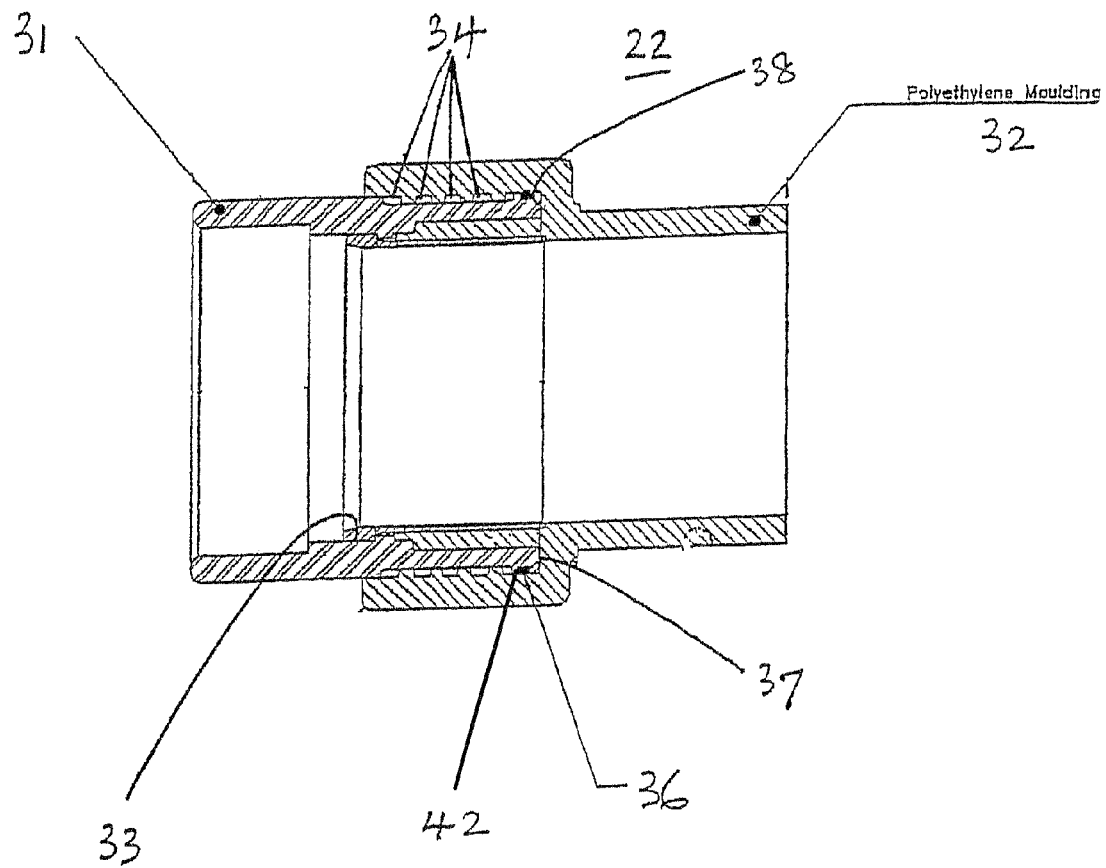
FIG. 2 illustrates a cross-section through a fitting according to one embodiment of the present invention.

FIG. 2 illustrates one example of a suitable fitting 22 in greater detail. The purpose of this fitting is to form a strong, permanent, fluid-tight seal between the fitting and the chamber wall 10 and between the fitting and the pipework system 4. Fitting 22 comprises a first tubular sleeve 31 formed from GRP or a material easily bondable to GRP such as a metal such as stainless steel or a coated steel material, bronze, brass or a brass alloy, or aluminium. An important feature is that the material must form a strong, substantially fluid-tight seal to the GRP wall using known resins, adhesives or the like. Plastics materials such as polyethylene or polyamides are not generally good at bonding to GRP using conventional resins or adhesives, hence the need for a two-part fitting.

The sleeve 31 is generally cylindrical in shape with a longitudinal axis through which a pipe (not shown) can pass. A second tubular sleeve 32 is moulded around one end of the first tubular sleeve, the sleeve 32 being formed from an electrofusible polymeric plastics material, compatible with the pipework system, such as polyethylene, polyamide or PVDF. Suitable materials will be discussed in more detail below.

In order to improve the fluid-tight nature of the seal between the two sleeves or components, a series of grooves, slots or ridges 34 are formed in the region of the first sleeve where the two sleeves overlap. When the second sleeve is formed around the first, plastics material fills these grooves, preventing the two components from separating in use.

Advantageously, part of the first tubular sleeve is encapsulated within part of the second tubular sleeve such that there is an overlapping region between the two sleeves. Encapsulating part of the first sleeve within the second sleeve creates a stronger fitting and one less prone to leakage over time.

It should be remembered that these fittings can often be used in inhospitable conditions, eg underground where there may be soil shrinkage, subsidence or other movement, and where fuel can escape in the case of a supply pipe failure.

Optionally, the seal between the two sleeves can be further improved by incorporating a sealing means such as an O-ring 36. The O-ring in this example nests into a annular channel 42 around the circumference of one or other of the sleeves. It will be appreciated that the O-ring seal can be positioned during assembly on either the first or second sleeve. For ease of construction it would normally be positioned on the outer surface of the first tubular sleeve, towards the end of that sleeve which is located within the main body of the fitting itself.

It will be appreciated that the O-ring could also be positioned in the end face 37 of the first sleeve, engaging with a shoulder 38 in the second sleeve.

Because the O-ring is internal to the fitting, and sealed within it, it is expected to have a very long life, at least the life of the fitting.

In this example, and in later examples which also include O-ring may be replaced by a bead of a suitable sealant. The use of a sealant may have advantages in that the sealant may also have adhesive properties, assisting in bonding two components together. The choice of sealant will be made by the materials specialist in that field.

There is a further optional feature which serves to strengthen the fluid-tightness for the seal between the first and second sleeves. A third tubular sleeve 33 is located on the inner surface of the fitting in the region where the first and second sleeve overlap. The purpose of this third sleeve, which is made from a metal such as stainless steel, coated steel or a polymer, is to prevent the polymeric plastics material component from withdrawing away from the first, GRP sleeve in the event it should shrink or soften when exposed to fuel or other chemicals.

Figure 3:
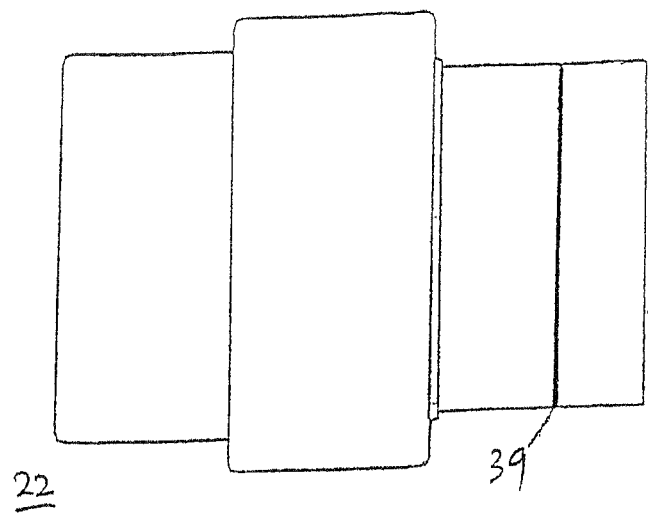
FIG. 3 illustrates an elevational view of the fitting shown in FIG. 2.

FIG. 3 illustrates a side elevational view of fitting 22 showing the neat, streamlined appearance and form resulting from this method of construction. A reference mark 39 enables an electrofusion coupling (see below) to be positioned and properly located over the end of the fitting made from electrofusible plastic. It also serves to identify that end of the fitting, if there were any doubt.

Figure 4:
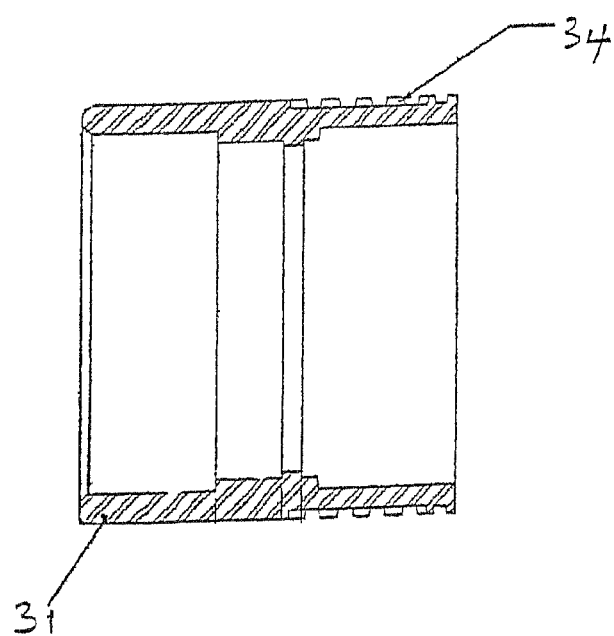
FIG. 4 illustrates a cross-section through a first tubular sleeve of the fitting shown in FIG. 2.

FIG. 4 shows a cross-sectional view of the first tubular sleeve 31 and shows in more detail the slots 34. It will be apparent from FIG. 4 the general simplicity of this GRP moulding. The slots 34 can take a wide variety of shapes, sizes, location and configuration. The essential feature is that they create indentations into which the liquid plastics material of the second tubular sleeve component can flow during manufacture.

In an alternative form of construction the slots 34 could take the form of screw threads such that the first and second sleeves could be formed separately and screwed together during construction. A chemical adhesive or a locking screw (not shown) could then be used to prevent the two sleeves coming apart during use.

Figure 5:
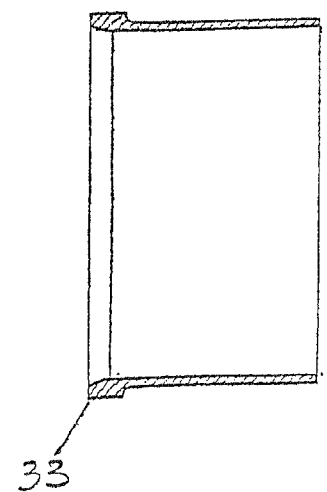
FIG. 5 illustrates a cross-section through a third tubular sleeve of the fitting shown in FIG. 2.
Figure 6:
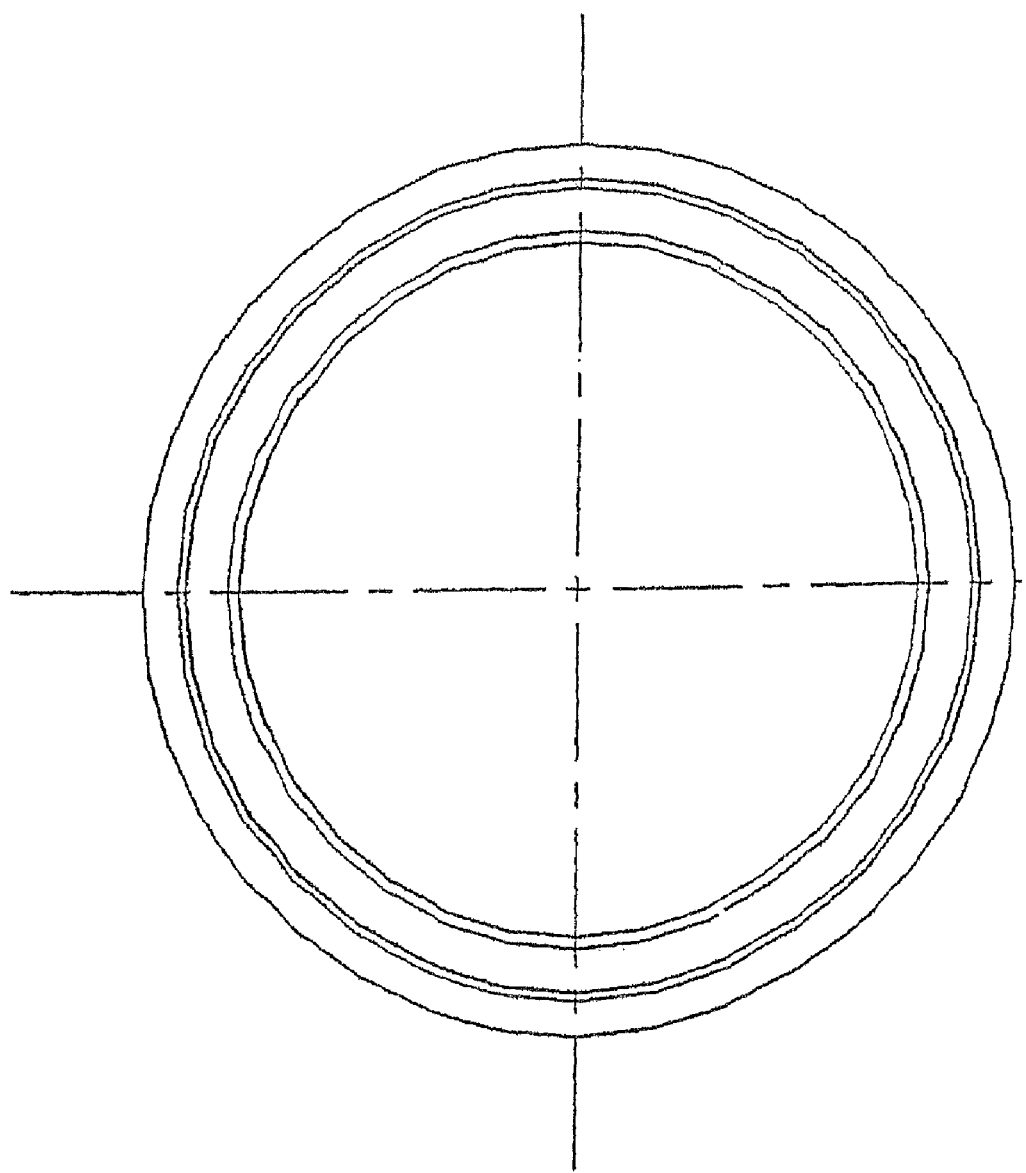
FIG. 6 shows an end elevation of the fitting of FIG. 2.

FIG. 5 shows the third tubular sleeve component in cross-section. This can be pressed into place after the second sleeve has been formed around the first, but while the material of the second sleeve is still warm and thus deformable.

Figure 8:
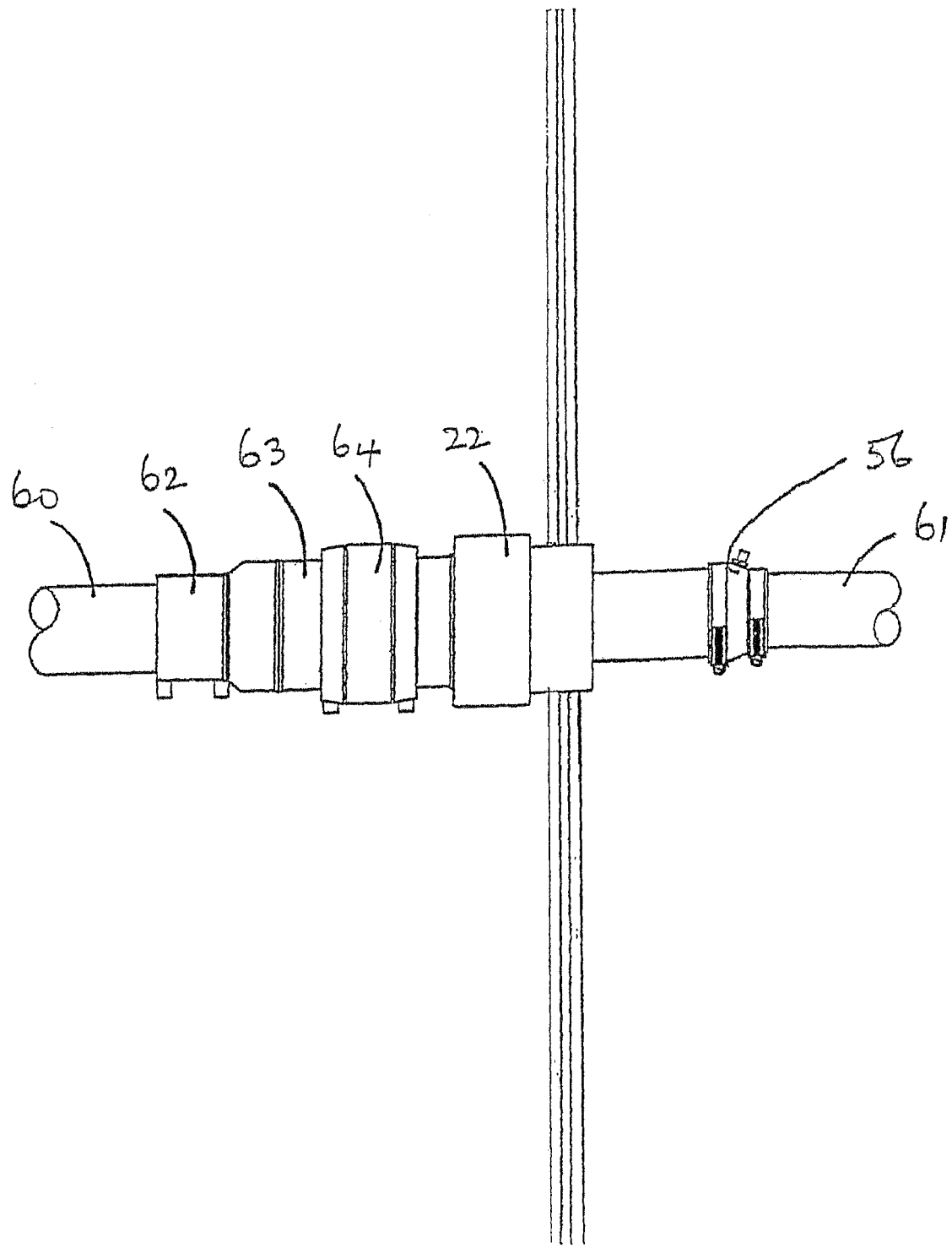
Figure 9:
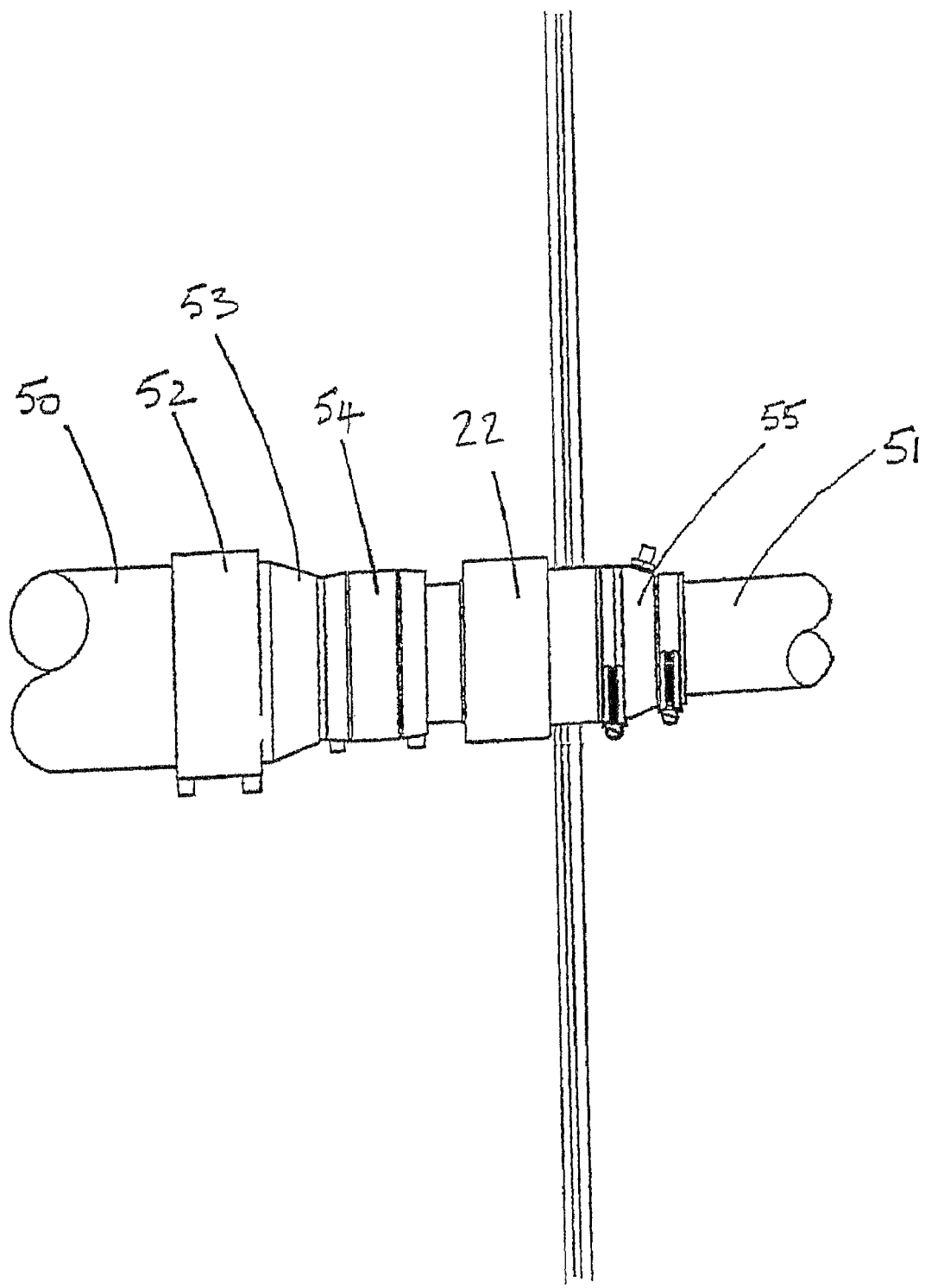

In use, and referring to FIGS. 8 and 9, the end of the GRP portion of the fitting is passed through an aperture in the chamber wall and temporarily held in place. A GRP bandage (not shown) is then used to seal the fitting to the chamber wall on one or both sides. The advantage of this arrangement is that both the fitting and the chamber wall are made of the same or compatible materials such that a strong, permanent, substantially fluid-tight seal can be easily formed. The necessary rubber boot 55, 56, is then used in conventional fashion to form a seal inside the chamber where a secondary pipework system is used. Outside the chamber electrofusion fittings may be used, together with expanders or reducers as necessary, to accommodate a secondarily contained pipe if secondary containment is present.

In FIG. 8 both the primary pipe 61 and the secondary pipe are sized such that they will pass through the fitting 22. The secondary pipe 60 is therefore sealed to the outside fitting 22 by way of an electrofusion coupling 62, expander 63 and electrofusion coupler 64. The termination between the primary and secondary pipes takes place inside the chamber using rubber boot 56.

It will be appreciated from FIG. 9, where the secondary pipe 50 containing the supply pipe 51 is larger than the internal diameter of the fitting, then the fitting itself becomes part of the secondary containment system. This is achieved through use of electrofusion coupling 52, reducer 53 and coupling 54 which in effect connects the secondary pipe 50 to the outside of the fitting 22. This illustrates part of the versatility of a fitting according to a first aspect of the present invention.

Figure 7:
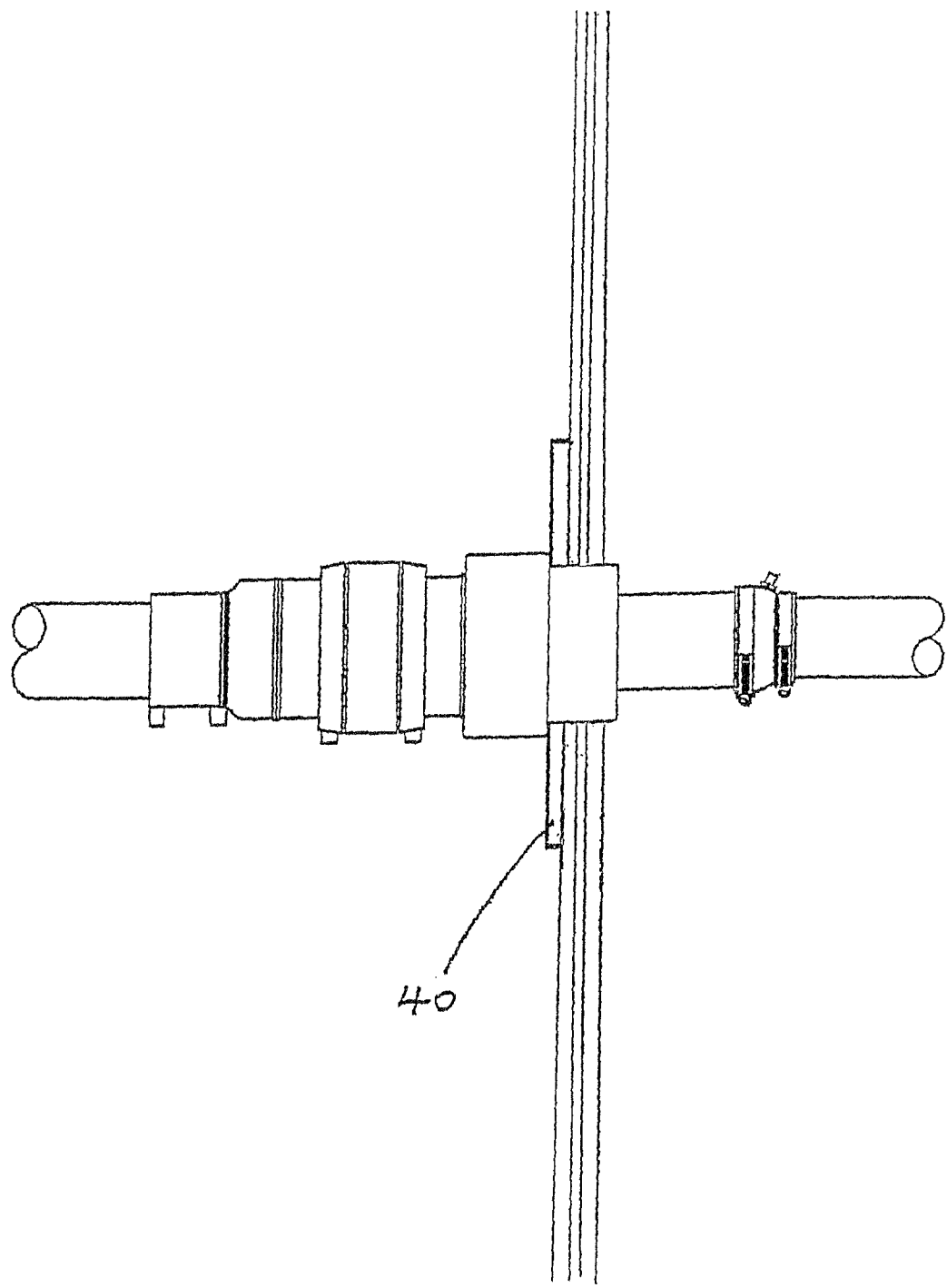
FIGS. 7, 8 and 9 show fittings according to the present invention in use through a chamber wall.

An alternative and preferred fitting incorporating a flange is shown in FIG. 7. Flange 40 extends radially from the GRP component of the fitting and may be formed integrally during construction of the first tubular sleeve. The flange is configured to conform to the shape of the chamber wall in the region of the aperture to be sealed. In this example it is shown as planar but other configurations are possible.

In use, resin is applied to the flange and the fitting clamped in place against the chamber wall while the resin sets. Further assembly takes place as described above.

Preferably the electrofusible component or components are formed from one or more plastics materials selected from the group comprising:
polyethylene;
polypropylene;
polyvinyl chloride;
polybutylene
polyurethanes;
polyamides, including polyamides 6, 6.6, 6.10, 6.12, 11 and 12;
polyethylene terphthalate;
polybutylene terephthalate;
polyphenylene sulphide;
polyoxymethylene (acetal);
ethylene/vinyl alcohol copolymers;
polyvinylidene fluoride (PVDF) and copolymers;
polyvinyl fluoride (PVF);
tetrafluoroethylene-ethylene copolymer (ETFE);
tetrafluoroethylene-hexafluroethylene copolymers (FEP)

ethylene tetrafluoroethylene hexafluropropylene terpolymers (EFEP)

terpolymers of tetrafluoroethylene, hexafluoropropylene and vinylidene fluoride (THV);
polyhexafluoropropylene;
polytetrafluoroethylene (PTFE);
polychlorotrifluoroethylene;
polychlorotrifluoroethylene (PCTFE);
fluorinated polyethylene;
fluorinated polypropylene;

and blends and co-polymers thereof.

This selection is not intended to be limiting but rather demonstrates the flexibility and breadth of the invention. The plastics material which is most compatible to the pipe to which it will be joined and with the lowest permeability to the fluid in question will usually be chosen by the materials specialist. Furthermore, it is known to use blends of two or more polymers and this invention extends to cover known and yet to be developed blends of plastics material.

The GRP resin component can be formed from any suitable thermosetting resin as selected by the materials specialist, including but not limited to polyester or epoxy resins.

The GRP sleeve can be formed by any of the conventional techniques used to mould GRP including hand lay-up, compression moulding or injection moulding. The present invention also extends to moulding methods yet to be discovered.

The examples described above relate principally to single wall chambers. However, fittings according to the present invention can be used equally well with double-walled chambers where there is an interstitial space between the two chamber walls. In that case a seal is formed between the fitting and the outer wall and between the fitting and the inner wall. This can be done using two bandages, one outside and one inside the chamber, or by a flange and a bandage on one or both sides of the chamber wall. In either case the integrity of the interstitial space between the chamber walls is maintained and can be monitored.

In summary, the present invention provides a fitting for forming a substantially fluid-tight seal between a pipe formed from an electrofusible plastics material and a GRP chamber wall. The fitting comprises a first component formed from an electrofusible plastics material compatible with the pipe and a second component, joined in a substantially fluid-tight manner to the first component, wherein the second component is adapted to be bonded to the GRP chamber wall. A flange or flanges associated with the second component may be employed as necessary. It is advantageous to use a flange on both sides of the chamber wall to effect a good seal. This is particularly important when forming a seal with a double walled chamber. Only one of the flanges may be an integral part of the fitting. The other flange may be connected to the fitting by securing means such as screw threads (see below) or by a resin bandage.

The plastics part of the fitting may incorporate one or more sets of electrofusion windings and associated terminals designed and adapted to form electrofusion weld(s) to a pipe, either primary or secondary or both, or to another plastics fitting. For simplicity, and to save on tooling costs, the plastics component may be adapted to form a tight sliding fit with the internal surface of a separate electrofusion coupling, which serves to couple the fitting to a pipe.

Figure 10:
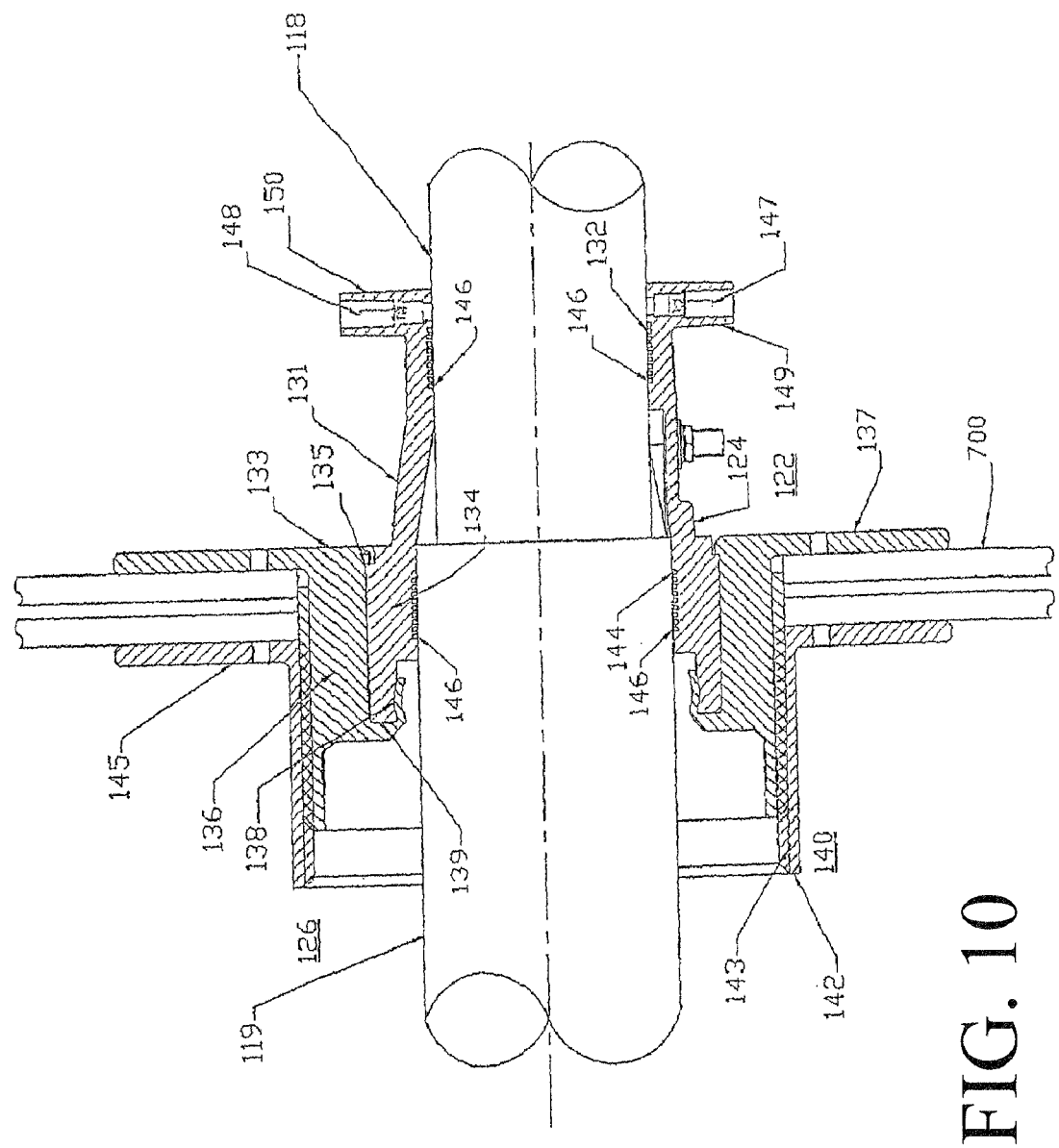
FIG. 10 illustrates a cross-section through a fitting according to a further embodiment of the invention with a first and second portion located on either side of double walled chamber, and FIG. 10a yet another alternative embodiment of the invention.
Figure 10A:
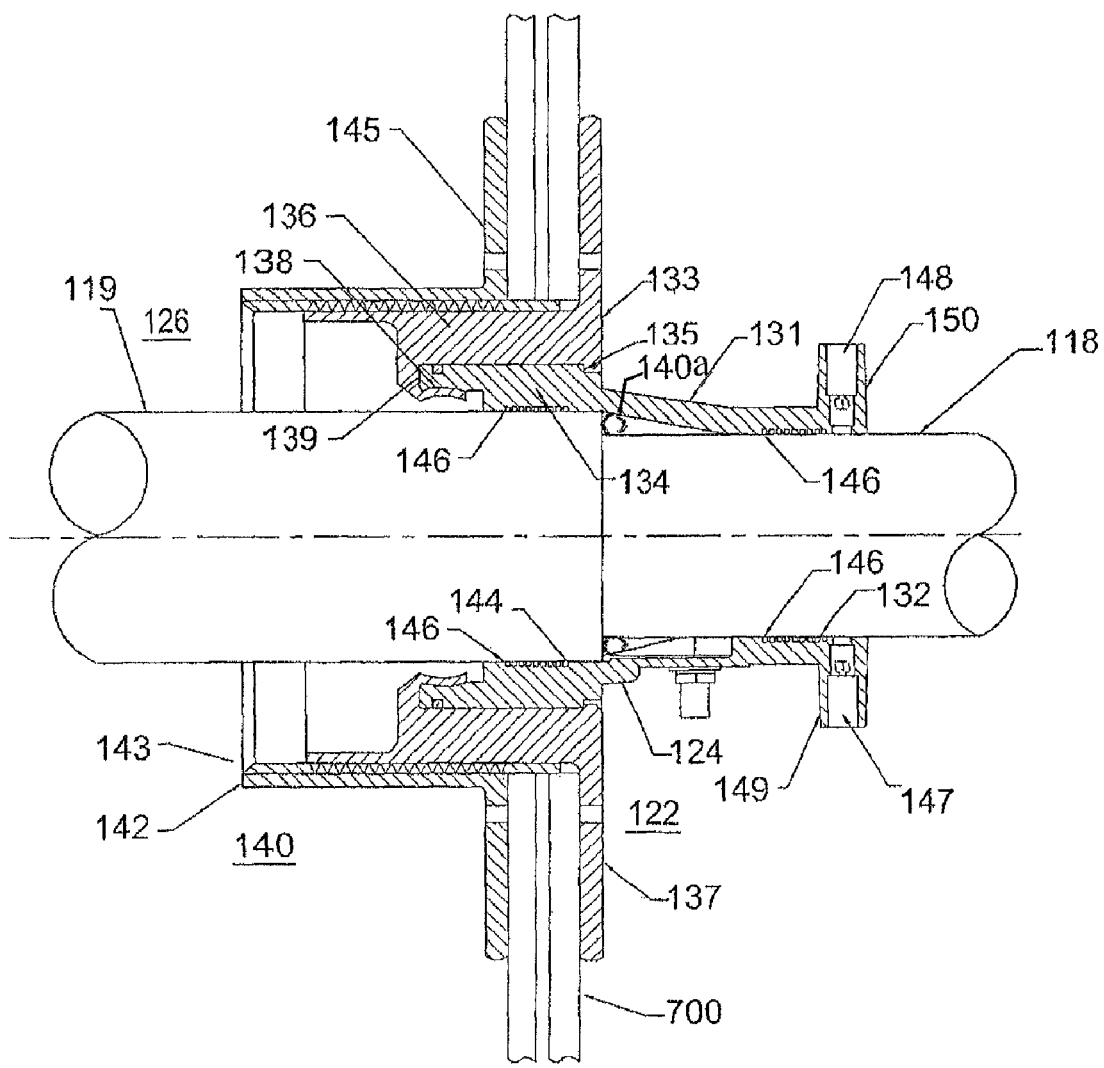
Figure 11:
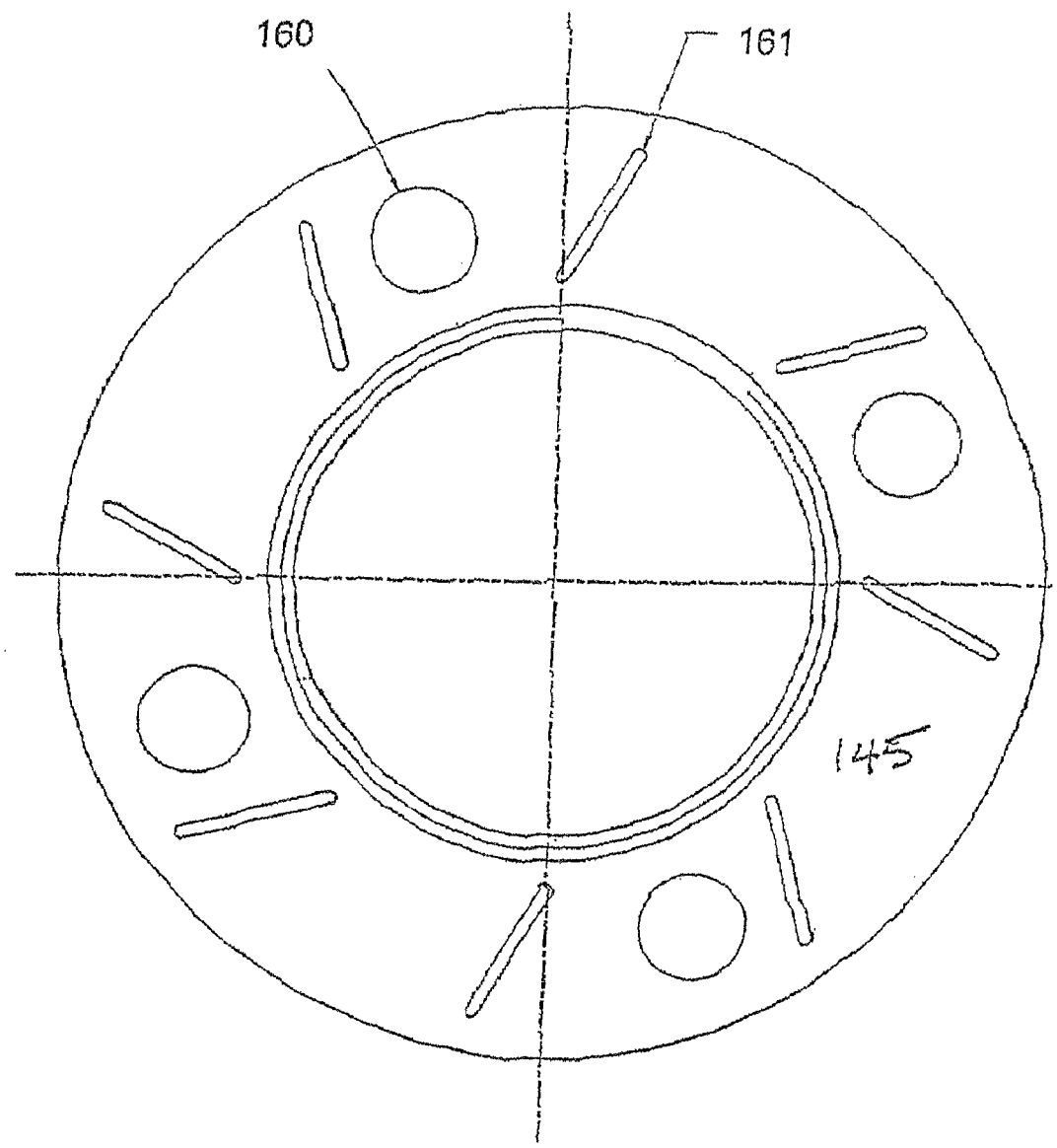
FIG. 11 illustrates an elevational view of a flange.

FIGS. 10 and 11 show a fitting according to a further embodiment of the invention. In this embodiment, fitting 122 comprises two separate components, a first portion 124, consisting of a plastics fitting 131 and a metal flanged fitting 133, and a second component or portion 140.

Turning first to the portion 124, the plastics part of the fitting 131 consists of a generally tubular sleeve in which one end, a first end 132, has an internal diameter which is a tight sliding fit over the outside of a primary pipe 118. The opposite or second end 134 of the sleeve has an internal diameter which is a tight sliding fit over the outside of a secondary pipe 119. The plastics part of the fitting 131 is thus generally cylindrical in shape with non-uniform cross-section having a longitudinal axis through which a primary pipe may pass through the entire body of this part of the fitting. A secondary pipe may pass along this longitudinal axis from one end of the fitting only and only up to a certain point, where its passage is halted by a reduction in the internal diameter of the fitting.

The inner surface 144 of the component 131 accommodates energy transfer means, in this case windings 146 of electrical heating wire which lie close to, or at, the internal surface of the plastics component 131. These windings are electrically connected to terminal pins 147,148 projecting from the plastics component 131. The terminal pins 147,148 can be shrouded by hollow cylindrical plastic terminal shrouds 149,150 projecting from, and integral with, the plastic component 131. The methodology for laying heating wires of this type on the inner surface of a plastics fitting is well known.

It is not essential that the electrofusion windings be incorporated into the fitting itself. For simplicity, and to save on tooling costs, the plastics portion of the fitting may be adapted to form a tight sliding fit with the internal surface of a separate electrofusion coupling, which serves to couple the fitting to a pipe. A rubber boot or boots may be used on the opposite side of the fitting to the electrofusion joint as necessary.

To complete the construction of the first portion of the fitting a flanged metal fitting 133 is joined in a substantially fluid type manner during manufacture around the outer portion of that end of plastics fitting 131 which is adapted to accommodate the secondary pipe. This metal part of the fitting 133 comprises a generally tubular region 136 threaded on its external surface at the end of the fitting adapted to accommodate the secondary pipe. Extending radially outwards from the tubular region 136 is a flange 137, one surface of which is adapted to conform to and engage with the surface of the chamber wall 700. Thus the flange may be flat if the sides of the chamber are flat or curved if the chamber has curved walls.

The threaded structure described above acts as a securing means to secure the first and second portions of the fitting together and to clamp them firmly on either side of the chamber wall. A variety of securing means can be used such as bolts or other clamping means.

In this example the metal component is crimped or internally swaged over the plastics component, which is held in place between shoulder 135 and crimp 138. Suitable metals include stainless steel, coated steel, aluminium, bronze, brass or a brass alloy.

In order to improve the fluid-tight nature of the seal between these two components, a series of grooves, slots or ridges (not shown) can be formed in the region where the two sleeves overlap. When the joint is formed, plastics material fills these grooves, preventing the two components from separating in use.

Optionally, the seal between the two sleeves can be further improved by incorporating a sealing means such as an O-ring or a sealant bead 140a. The O-ring or sealant nests into a annular channel around the circumference of one or other of the sleeves. It will be appreciated that the O-ring seal/sealant can be positioned during assembly on either the first or second sleeve. For ease of construction it would normally be positioned on the outer surface of the plastic tubular sleeve, towards the end of that sleeve which is located within the body of the fitting itself.

It will be appreciated that the sealing means could also be positioned in the end face 139 of the first sleeve, engaging with a shoulder 135 in the second sleeve.

Because the O-ring seal is internal to the fitting, and sealed within it, it is expected to have a very long life, at least the life of the fitting.

The second portion of the fitting 140 comprises a generally tubular component 142 with internal threads 143. The diameter, size, shape, depth and pitch of threads of this component are designed to allow this second portion to thread onto and over the corresponding end of the metal part of the first component. This second portion also has a radially extending flange 145.

The flange 145 can be seen in more detail in FIG. 11. The face of the flange is perforated by a series of apertures. Apertures or indentations 160 are provided in order to engage the flange with a tool during assembly to turn it and tighten it against the chamber wall. Cut outs or slots 161 are provided to allow resin to pass through the body of the flange to increase the strength of bond between the flange and the wall (see below).

Various other shapes and devices can be used to provide a turning purchase on the flanges. Opposing sides of one or both portions could contain flats such that a spanner, wrench or special tool could be used. Alternatively the flange could incorporate protrusions or cut outs which could be used to obtain the necessary purchase.

In use, the first portion 124 of the fitting is passed through a pre-drilled hole in the chamber wall, usually from the inside of the chamber, until the flange engages flat against the chamber wall. Before doing this however, GRP resin, glass fibre mat or other adhesive is applied to the face of the flange or to the chamber wall around the aperture or to both. Similar adhesive is applied to the flange/chamber wall on the outside of the chamber. Alternatively the flange(s) may be clamped firmly against the chamber wall and resin or other suitable adhesive applied over substantially the whole exposed surface of the flange and the surrounding area. This will also result in a strong fluid-tight seal.

In a further alternative resin/adhesive may be applied to both faces of the flange, both between the flange and the chamber wall and over the external, exposed face of the flange.

The second portion of the fitting 126 is then screwed onto the threaded portion of the first fitting which extends through the chamber wall, and the two portions of the fitting are tightened onto the chamber walls to form a fluid-tight seal once the adhesive has set.

A primary and secondary pipe are then passed through the fitting as shown in FIG. 10 and an electric current passed through windings 146 to seal both primary and secondary pipes to the fitting.

It will be appreciated from the foregoing description that the metal internal termination fitting is internally crimped to the reducer fitting in production. In the field the complete internal fitting is passed through the hole and the external flange is screwed into position to secure the fitting. The metal flanges are then bonded to the sump wall using resin and glass fibre mat. Primary and secondary pipes can then be fused by electrofusion.

Figure 12:
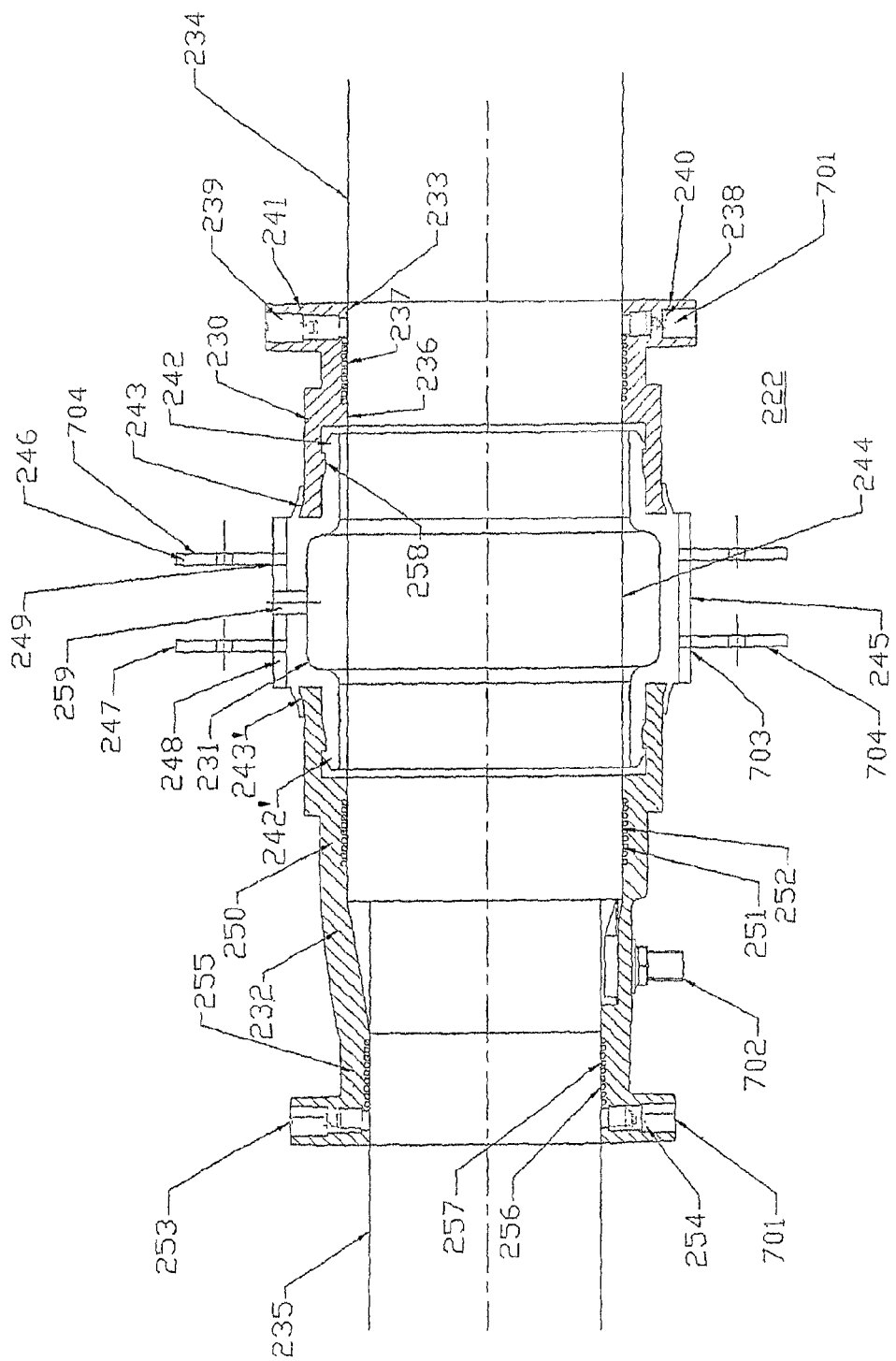
FIG. 12 illustrates a cross-section through a fitting according to a still further embodiment of the invention.
Figure 13:
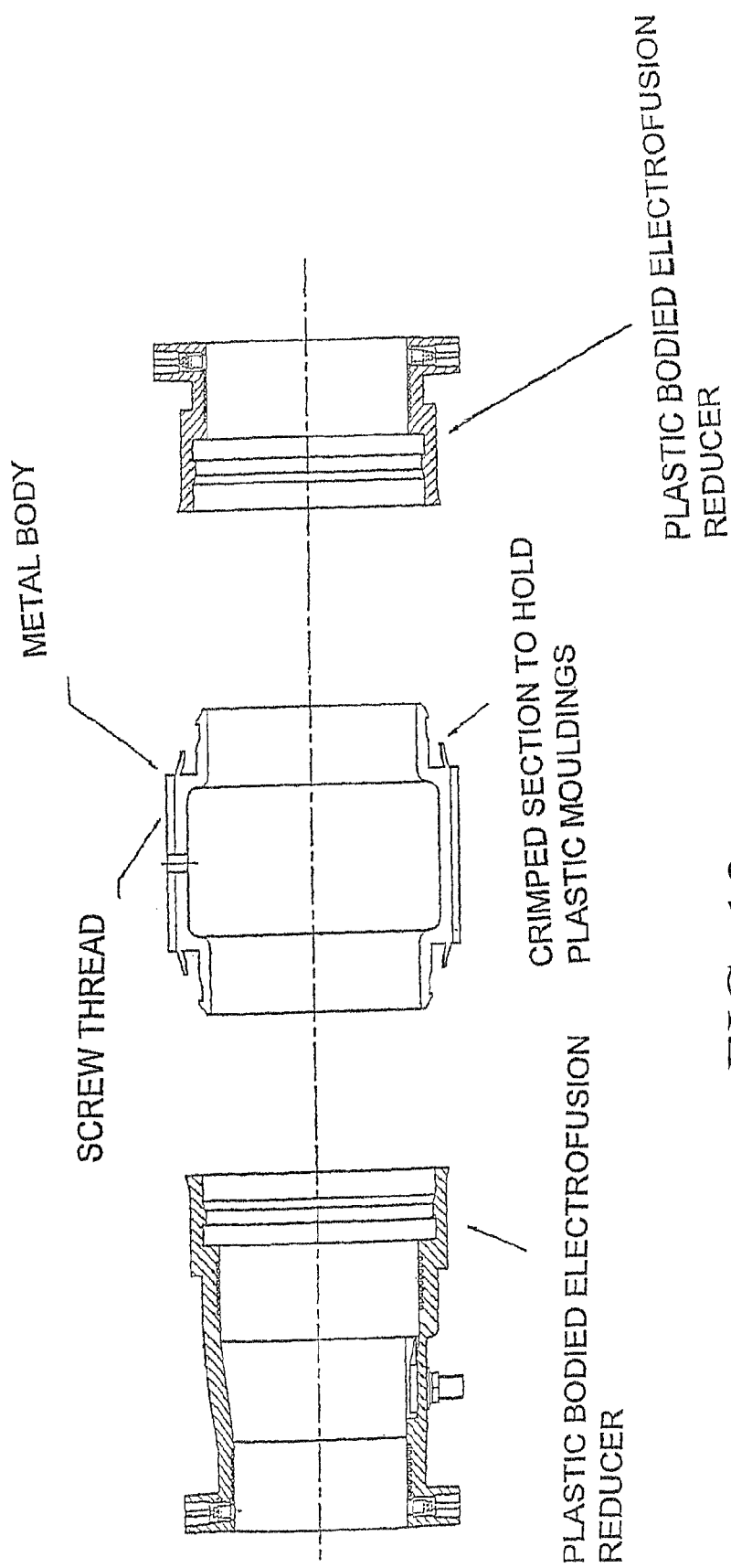
FIG. 13 illustrates an exploded cross-section of the three portions of the filling of FIG. 12.
Figure 14:
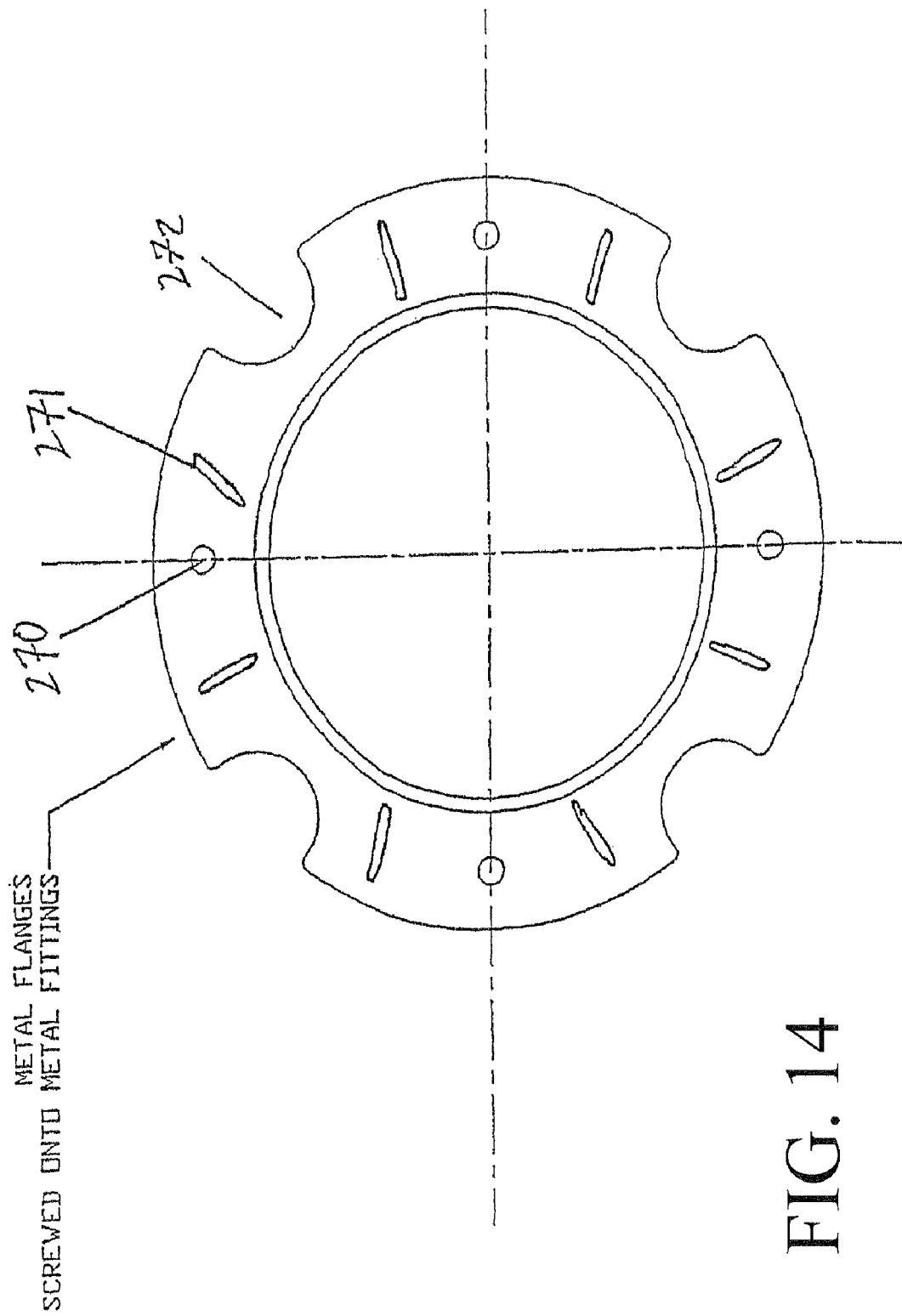
FIG. 14 illustrates an elevation view of a flange.

FIGS. 12, 13 and 14 illustrate a further embodiment of the present invention. In this embodiment, fitting 222 comprises three portions, a first portion 230, a second portion 231 and a third portion 232. For the avoidance of any doubt, in the multi-component system described below, item 231 corresponds to the item referred to as a "first portion" in claim 1 and items 230 and 232 correspond to the "second" and "third" items respectively.

Turning first to portion 230, a first end 233, has an internal diameter which is a tight sliding fit over the outside of the secondary pipe 234. Portion 230 is thus generally cylindrical in shape with non-uniform cross-section having a longitudinal axis through which a secondary pipe may pass through the entire body of the portion.

In this particular embodiment, the first portion 230 and the third portion 232 are formed from plastics material, such that the inner surface of those portions, at least, is electrofuseable to the outer surface of the primary and secondary pipe, to form a substantially fluid-tight seal there between. The inner surface 236 of the portion 230 accommodates energy transfer means, in this case windings 237 of electrical heating wire which lie close to, or at, the internal surface of the portion 230. These windings are electrically connected to terminal pins 238, 239 projecting from the plastics portion 230. The terminal pins 238, 239 can be shrouded by hollow cylindrical plastic terminal shrouds 240, 241 projecting from, and integral with, the portion 230. The methodology for laying heating wires of this type on the inner surface of a plastics fitting is well known.

The first portion of the fitting is joined in a substantially fluid type manner during manufacture to the second portion 231. Portion 231 is generally manufactured of metal but can be manufactured from any material strong enough to hold a screw thread and engage a complementary screw threaded article. In this example the second portion 231 is made of metal and is crimped or externally swaged 243 onto the first portion. An outwardly extending flange or hook 242 engages with a shoulder or step 258 on the first portion 230 to prevent lateral or axial movement of the first portion 230 once the joint between them has been made and provides greater strength and stability once the two components are joined together. The second portion 231 can be slotted radially or longitudinally to resist any movement of the plastic component 230. In order to improve the fluid-tight nature of the seal between these two components, a series of grooves, slots or ridges (not shown) can be formed in the region where the two sleeves overlap. When the joint is formed, plastics material fills these grooves, preventing the two components from separating in use.

Optionally, the seal between the two sleeves can be further improved by incorporating a sealing means such as an O-ring or bead of sealant (not shown). The O-ring nests into a annular channel around the circumference of one or other of the portions. It will be appreciated that the O-ring seal can be positioned during assembly on either the first or second portion. For ease of construction it would normally be positioned on the outer surface of the first portion, towards the end of that portion which is located within the body of the fitting itself.

It will be appreciated that the sealing means could also be positioned in the end face of the first portion, engaging with a shoulder in the second portion.

Because the sealing means is internal to the fitting, and sealed within it, it is expected to have a very long life, at least the life of the fitting.

The second portion 231 has an internal diameter which can accommodate the secondary pipe 234, either leaving a space 244 or, as an alternative embodiment, as a tight sliding fit over the outside of the secondary pipe 234. In either case some form of space will exist between the inner surface of the second portion 231 and the outside of the secondary pipe, even if this space is not visible to the eye.

The outer surface 245 of the second portion is adapted to accommodate one or more radially extending flanges 246, 247 by means of a screw threaded region 248, 249. The internal diameter of the flange(s) are adapted to comprise a complementary screw threaded region. In an alternative embodiment one of the flanges 246, 247 could be an integral part of portion 231.

The flanges 246, 247 are adapted to conform to and engage with the surface of the chamber wall. Thus the flange(s) may be flat if the sides of the chamber are flat or curved if the chamber has curved walls.

The diameter, size, shape, depth and pitch of threads of this component are designed to allow the flange(s) to thread onto and over the corresponding end of the second portion.

A typical example of the flange(s) 246, 247 can be seen in more detail in FIG. 14. The face of the flange is perforated by a series of apertures. Apertures or indentations 270, 272 are provided in the face of the flange in order to engage the flange with a tool during assembly to turn it and tighten it against the chamber wall. Cut outs or slots 271 can be provided to allow resin to pass through the body of the flange in use to increase the strength of bond between the flange and the wall (see below).

Various other shapes and devices can be used to provide a turning purchase on the flanges. Opposing sides of one or both portions could contain flats such that a spanner, wrench or special tool could be used. Alternatively the flange could incorporate handles, protrusions or cut outs which could be used to obtain the necessary purchase.

The flange is shown as having a uniform cross-section. However, in order to extend the screw-threaded region on the flange, the flange could incorporate a collar (not shown) extending around the central aperture in the flange and extending longitudinally along the fitting. Substantially the entire inner surface of said collar may then be screw threaded.

With reference to FIG. 14, the indentations 272 are in effect castellations in the outer circumferential edge of the flange. These castellations, which can vary in their number, their spacing around the perimeter of the flange, and the extent to which they extend into the body of the flange, serve two purposes. Firstly, they allow a tool to engage the flange in order to rotate it and tighten it against the chamber wall. Secondly, when overlaid with resin, they significantly strengthen the bond between the fitting and the GRP chamber wall. It follows therefore that it is not essential to have apertures extending through the face of the flange, but merely castellations or indentations in the edge of the flange.

One of the flanges, but not both, may be formed as an integral part of the second portion 231. This provides for increased strength in the fitting but does mean that the fitting may only pass through the aperture in the chamber wall in one direction.

The second portion 231 is also joined in substantially a fluid-tight manner during manufacture to the third portion 232. Again, in this example the second portion is crimped or externally swaged over the third portion which is held in place between shoulder 242' and crimp 243'. The join between the second and third portions is essentially the same as the join between the first and second portions described above and as illustrated in FIGS. 12 and 13.

The third portion 232 comprises a first region 250 adapted to form a tight sliding fit with the secondary pipe 234. The secondary pipe may pass along the third portion from one end only and only up to a certain point, where its passage is halted by a reduction in the internal diameter of that portion. The inner surface 251 of the portion 232 accommodates energy transfer means, in this case windings 252 of electrical heating wire which lie close to, or at, the internal surface of the first region 250 of the third portion 232. These windings are electrically connected to terminal pins 253, 254 projecting from the plastics portion 232, in series with a second set of windings (see below).

The third portion 232 further comprises a second region 255 adapted to form a tight sliding fit with the primary pipe 235. The inner surface 256 of the second region 255 of the third portion 232 accommodates energy transfer means, in this case windings 257 of electrical heating wire which lie close to, or at, the internal surface of the second region 255 of the third portion 232. These windings are also electrically connected to terminal pins 253, 254 projecting from the plastics portion 232. Thus when the terminal pins 253, 254 are activated both energy transfer means 252 and 257 will be activated and will fuse to both the primary 235 and secondary 234 pipe.

In an alternative embodiment windings 252 and 257 could be connected to separate pairs of terminal pins. This arrangement would allow electrofusion welds to the secondary and primary pipes to be formed in separate operations.

The threaded regions 248, 249 act as a securing means to secure the flanges 246, 247 onto the second portion and to clamp them in use firmly on either side of the chamber wall. A variety of securing means can be used such as bolts or other clamping means.

In use, a first flange 246 is slid over the secondary pipe 234, assuming this is already in place. The fitting comprising the first 230, second 231 and third 232 portions is then passed through a pre-drilled hole in the chamber wall, usually from the inside of the chamber. The flange 246 is then slid back over the first portion and screwed onto the threaded region 249 of the second portion which extends through the chamber wall, until the flange engages flat against the chamber wall.

Before doing this however, GRP resin, glass fibre mat or other adhesive is applied to the face of the flange or to the chamber wall around the aperture or to both. Similar adhesive is applied to the flange/chamber wall on the outside of the chamber. Alternatively the flange(s) may be clamped firmly against the chamber wall and resin or other suitable adhesive applied over substantially the whole exposed surface of the flange and the surrounding area. This will also result in a strong fluid-tight seal.

In a further alternative resin/adhesive may be applied to both faces of the flange, both between the flange and the chamber wall and over the external, exposed face of the flange.

The second flange 247 is then screwed onto the threaded region 248 of the second portion, and the two flanges are tightened onto the chamber walls to form a fluid-tight seal once the adhesive has set.

A primary and secondary pipe are then passed through the fitting as shown in FIG. 12 and an electric current passed through windings 237, 252 and 257 to seal both primary and secondary pipes to the fitting.

It will be readily appreciated that the plastics part of this type of fitting can be formed from a wide variety of plastics materials as selected by the materials specialist and as described above.

It will also be appreciated that fittings according to the present invention comprise one portion which is made from the same material as the chamber wall or a material compatible with the chamber wall such that a strong, permanent, substantially fluid-tight seal between the two can easily be formed. They also comprise one, or optionally two, other portions made from an electrofusible plastics material. If two such portions are provided, then they are located on opposite sides of the first portion such that a pipe may pass through the fitting along its longitudinal axis. A flange preferably extends radially outwards from the first portion. The first portion is joined to the other portion(s) in a substantially fluid-tight manner during manufacture.

Fittings according to the present invention can be used equally well on single or double walled chambers. Because a seal is formed on both sides of the wall, the integrity of the interstitial region between the chamber walls in a double walled chamber is maintained and can be monitored. Such fittings can be used equally well to form a seal between a pipe and the wall of a sump, such as sumps 68 and 70 in FIG. 1.

It is possible to monitor the space 244 formed between the outer surface of the secondary pipe 234 and the inner surface of the second portion. If the wall of the containment chamber is secondarily contained a hole 259 can be drilled in the second portion to connect the space 244 with the interstitial region of the wall of the containment chamber. It is then possible to monitor the space 244 and thus the whole fitting at the same time as monitoring the interstitial region of the wall.

For the purposes of this description the term pipe generally refers to a circular cross-sectioned pipe. However, this invention also covers pipes having other cross-sections such as box sections, corrugated and the like and also single walled or secondarily contained pipes.

In a further embodiment as shown in FIG. 15, the coupling between the primary pipe 435 and the wall 408 (e.g. the wall of a chamber or sump) comprises five principal components, namely a first coupling portion 430, a first intermediate member 440, a second coupling portion 450, a second intermediate member 460, and a third coupling portion 470. The first coupling portion 430, first intermediate member 440, second intermediate member 460 and third coupling portion 470 are made of one or more electrofusible plastics materials, examples of which have been provided above.

For the avoidance of any doubt, in the multi-component system described in this example, item 450 corresponds to the item referred to as a "first portion" in the wording of claim 1 and items 460 and 440 correspond to the "second" and "third" portions respectively.

As shown in the figure, in this example the wall 408 comprises a double wall 410, 412, with an interstitial space 414 therebetween.

Approaching the wall 408 from the left of the figure is a secondarily contained pipe assembly comprising a primary supply pipe 435 contained within a secondary pipe 434, with an interstitial space therebetween. The primary pipe 435 passes through an aperture in the wall 408 and extends towards the right of the figure. Additional pipework 436 is shown by way of an example of possible further pipework that may be connected to the primary pipe 435.

The first coupling portion 430 is configured such that the secondary pipe 434 passes into the first coupling 430, and is arranged such that the secondary pipe 434 extends approximately midway along the length of the first coupling 430. The first coupling 430 comprises a first portion 438 adapted to form a tight sliding fit around the external surface of the secondary pipe 434, and a second portion 439 adapted to couple to the first intermediate member 440. A ridge, protrusion or stop 433 (which may be annular) may be provided for the secondary pipe 434 to butt against. This stop 433 determines the extent to which the secondary pipe 434 may inserted within the first coupling 430, and ensures that, when the secondary pipe 434 is fully inserted against the stop 433, it is sufficiently far in for a satisfactory coupling to be formed. The first coupling 430 further comprises energy transfer means (e.g. electrofusion windings (not shown)) in regions 438 and 439, electrically connected to terminals 431 and 432. The third coupling portion 470 comprises a portion 474 adapted to provide a tight sliding fit around the exterior of the primary pipe 435. The internal diameter of the third coupling 470 widens to provide a second portion 476 adapted to couple to the second intermediate member 460. The third coupling 470 comprises energy transfer means (e.g. electrofusion windings (not shown)) in regions 474 and 476, electrically connected to terminals 471, 472.

The second coupling portion 450 is adapted to locate within the aperture provided in the wall 408, and to form a fluid-tight connection between the second coupling 450 and the wall 408. In a presently preferred embodiment this second coupling 450 is made of brass, although other metallic or plastics materials that are resistant to fuel and which may be bonded or joined to the wall material may alternatively be used. GRP is another suitable material.

The second coupling 450 comprises a first integral member 451, 452, 453, 454, 458 and a second, initially separate, flange or collar 457. The flange or collar 457 is preferably provided with a thread (or alternative attachment means) to enable it to be attached to a corresponding thread or attachment means provided on the first member 451, 452, 453, 454, 458, resulting in the configuration shown in the figure. The threads on the first member (adjacent region 453) are positioned such that, when installed, they are to one side of the wall 408 and do not interfere with the hole in the wall.

Optional O-rings or sealant bead 455, 456 as a sealing means may be provided on the inner surface of region 458 and on the inner surface of the collar or flange 457, such that the sealing means form or enhance a fluid-tight seal with the external surfaces of the walls 410, 412.

Additionally, a hole or aperture 459 may be provided through the second coupling 450, from a point between regions 451 and 452 to a point between region 458 and the collar 457, such that, when installed, the interstitial space 414 within the wall 408 is in fluid communication with a void 416 between the second coupling 450 and the exterior of the primary pipe 435.

The second coupling 450 is configured such that the first intermediate member 440 can locate between regions 451 and 453, and that the second intermediate member 460 can locate between regions 452 and 454. Either during manufacture of the second coupling 450, or during installation, the first intermediate member 440 is inserted between regions 451 and 453, and the second intermediate member 460 is inserted between regions 452 and 454, and regions 453 and 454 are swaged or otherwise deformed so as to grip the intermediate members 440 and 460.

During installation, the second coupling 450 (with the first and second intermediate members 440, 460 attached) is inserted into the aperture in the wall 408, from the right side of the wall as shown in the figure, in a leftward direction, such that region 451 passes through the wall 408. (If used, O-ring 456 would be put in place in region 458 beforehand.) The second coupling 450 is maneuvered until region 458 (and the O-ring 456) are adjacent the outer surface of wall 412. The collar or flange 457 (with O-ring 455 in place, if used) is then screwed into place over region 453, until it is flush against the outer surface of wall 410, in the configuration shown in the figure. GRP bonding, adhesives or other sealants 490, 491 may then be applied around the flange 457 and region 458 of the second coupling 450, and around the second coupling 450 in general, overlapping the walls 410, 412, regions 457 and 458, and regions 453 and 454 onto the first and second intermediate members 440, 460, thereby obtaining a fluid-tight seal between the second coupling 450 and the wall 408.

The first coupling 430 is then located around the first intermediate member 440, such that the portion 439 of the first coupling makes a close fit with the intermediate member 440.

The primary pipe 435 is then introduced through the first coupling 430, and subsequently through the second coupling 450 and beyond. The secondary pipe 434 is introduced into the first coupling 430 as far as the stop 433.

From the right side of the figure, the third coupling 470 is then introduced such that region 476 locates around the second intermediate member 460, and region 474 forms a tight sliding fit around the primary pipe 435.

Additionally, the energy transfer means incorporated in the first coupling 430 and the third coupling 470 are energised by the connection of an electrical supply to terminals 431 and 432, and to terminals 471 and 472. This results in the formation of fluid-tight electrofused connections between region 438 of the first coupling 430 and the exterior of the secondary pipe 434, between region 439 of the first coupling 430 and the first intermediate member 440, between region 476 of the third coupling 470 and the second intermediate member 460, and between region 474 of the third coupling 470 and the exterior of the primary pipe 435.

Once the first, second and third couplings (430, 450, 470) and the first and second intermediate members (440, 460) are installed, void 416 beneath the secondary coupling 450 is in fluid communication with the interstitial space between the primary pipe 435 and the secondary pipe 434. If a hole or aperture 459 is provided between the interstitial space 414 in the wall and the void 416, then the interstitial space 414 is consequently in fluid communication with the interstitial space between the primary pipe 435 and the secondary pipe 434.

FIG. 16 illustrates another embodiment of a fitting comprising a first coupling portion 530, a second coupling portion 550 and a third coupling portion 570. The arrangement of the primary pipe 435, secondary pipe 434 and the wall 408 is the same as in FIG. 15 described above.

The first coupling portion 530, second coupling portion 550 and third coupling portion 570 are made of one or more electrofusible plastics materials, examples of which have been provided above.

The first coupling portion 530 comprises regions 538 and 539, each of which incorporates energy transfer means such as an electrofusion winding (not illustrated), connected to electrical terminals 531 and 532. The internal surface of region 538 is configured to form a tight sliding fit with the exterior of the secondary pipe 434. As with the embodiment of FIG. 15, a protrusion, ridge or stop 533 is provided for the secondary pipe 434 to but against.

The third coupling portion 570 comprises a first region 574 adapted to form a tight sliding fit with the exterior of the primary pipe 435, and a second region 576 adapted to couple with the second coupling portion 550. Regions 574 and 576 incorporate energy transfer means such as electrofusion windings (not shown), connected to electrical terminals 571 and 572.

The second coupling portion 550 here comprises a unitary article 551, 552, 558 made of electrofusible plastics material. In effect, this unitary article is equivalent to the first and second intermediate members (440, 460) in the embodiment of FIG. 15, in combination with regions 451, 452, 453, 454 and 458 of the second coupling portion 450 of FIG. 15. However, in the present embodiment, by being formed of an electrofusible material the first and third coupling portions 530, 570 may be directly coupled to the second coupling 550 using electrofusion bonding, without the need for separate intermediate members (440 and 460 as described above) or swaging (e.g. of regions 453 and 454 described above).

A separate threaded flange or collar 557 is adapted to engage with corresponding threads provided on the outer surface 553 of the second coupling portion 550. The threads on surface 553 are positioned such that, when installed, they are to one side of the wall 408 and do not interfere with the hole in the wall. Optional sealing means such as sealant beads or O-rings 555, 556 may be included as before. With reference to FIG. 16, the mechanism by which the collar 557 attaches to the second coupling 550 involves introducing the collar 557 from the left in a rightward direction, such that the collar engages with the threads provided on surface 553 of the second coupling 550. The threads incorporated in the collar 557 and on the surface 553 may be moulded as an integral part of these components, or may be subsequently formed using a tapping technique that will be well known to those skilled in the art. The thickness of the flange or collar 557 may be made greater than that shown in FIG. 16, due to the limitations associated with manufacturing threaded plastic components.

A hole or aperture 559 may be provided through the second coupling portion 550, such that, once installed, the interstitial space 414 within the wall 408 is in fluid communication with a void 516 between the second coupling portion 550 and the exterior of the primary pipe 435.

During installation, the second coupling 550 is inserted into the aperture in the wall 408, from the right side of the wall as shown in FIG. 16, in a leftward direction, such that region 551 passes through the wall 408. (If used, O-ring or sealant bead 556 would be put in place in region 558 beforehand.) The second coupling 550 is maneuvered until region 558 (and the O-ring 556) are adjacent the outer surface of wall 412. The collar or flange 557 (with O-ring 555 in place, if used) is then screwed into place onto region 553, until the collar 557 is flush against the outer surface of wall 410, as shown in the figure. GRP bonding, adhesives or other sealants 590, 591 may then be applied around the flange 557 and region 558 of the second coupling 550, and around the second coupling 550 in general, overlapping the walls 410, 412 and thereby obtaining a fluid-tight seal between the second coupling 550 and the wall 408.

The first coupling 530 is then brought into place, such that region 539 of the first coupling makes a close fit with region 551 of the second coupling 550.

The primary pipe 435 is then introduced through the first coupling 530, and subsequently through the second coupling 550 and beyond. The secondary pipe 434 is introduced into the first coupling 530 as far as the stop 533.

From the right side of the figure, the third coupling 570 is then introduced such that region 576 locates around region 552 of the second coupling 550, and region 574 forms a tight sliding fit around the primary pipe 535.

Finally, the energy transfer means incorporated in the first coupling 530 and the third coupling 570 are energised by the connection of an electrical supply to terminals 531 and 532, and to terminals 571 and 572. This results in the formation of fluid-tight electrofused connections between region 538 of the first coupling 530 and the exterior of the secondary pipe 534, between region 539 of the first coupling 530 and region 551 of the second coupling 550, between region 576 of the third coupling 570 and region 552 of the second coupling 550, and between region 574 of the third coupling 570 and the exterior of the primary pipe 435.

Once the first, second and third couplings (530, 550, 570) are installed, void 516 beneath the secondary coupling 550 is in fluid communication with the interstitial space between the primary pipe 435 and the secondary pipe 434. (Although not immediately apparent from FIG. 16, a channel or recess is provided through region 551 of the second coupling 550, such that the void 516 is in fluid communication with the interstitial space between the primary pipe 435 and the secondary pipe 434.) If a hole or aperture 559 is provided between the interstitial space 414 in the wall and the void 516, then the interstitial space 414 is consequently in fluid communication with the interstitial space between the primary pipe 435 and the secondary pipe 434.

In several of the embodiments described above, one or both flanges are retained on the body of the fitting using a screw thread arrangement. This is only one form of securing means which can be used to retain a flange in place. For example, the flange(s) could be fixed into position by means of a bayonet-type fitting. Alternatively, a floating flange ring could be used which is not initially mechanically secured to the fitting body. Rather, the flange ring is a tight sliding fit with the portion of the fitting adapted to bond to the fibre reinforced plastics material of the chamber wall and is held in place by the adhesive used to bond that portion of the fitting to the chamber wall.

In essence, the present invention is intended to encompass any securing means, apparatus or arrangement suitable to hold the flange(s) in position with respect to the portion to which they are attached. However, the screw thread arrangement has the advantage that the flange(s) can be progressively tightened against the chamber wall.

In order to improve the adhesion of flange to the chamber wall, the face of the flange may include slots, grooves or channels or the like which, in use, become filled with adhesive. One suitable arrangement is to provide one or more annular grooves or channels in the face of the flange which contacts the chamber wall. These endless grooves can be filled with sealant or adhesive before the parts are assembled. This arrangement can significantly improve the quality and durability of the seal and adhesion between the flange and the chamber wall.

It will further be appreciated that only one side of the fitting, namely the first portion, needs to be formed from an electrofusible plastics materials. Further connections can be made to the second portion of the fitting using a rubber boot or boots. This can considerably simplify manufacture.

In a further variant, illustrated in FIG. 17, a flange cover 660, 661 can be provided to overlay the flange on one or both sides of the fitting. The flange cover may preferably be formed from fibreglass or other GRP material and is preferably filled with a resin during assembly. By forcing the flange cover against the flange and against the chamber wall a neat, strong seal can be made encapsulating the flange and that part of the chamber wall, within a cocoon of resin 707. This arrangement has the advantage that the flange covers may be clamped in place whilst the resin or adhesive sets. If desired the covers could make contact with the flange at pre-determined points such that the clamping force also forces the flange into contact with the chamber wall. A further advantage of these covers is that they minimise the possibility of resin coming into contact with other parts of the fitting during the assembly process.

REFERENCE NUMERAL

160 Handles for hand tightening duration installation
161 Cut outs for resin impregnation
700 double wall sump
701 weld teat psn tbc
702 Test point valve
703 Fine BSP thread
704 Flange
705 Coupler
706 Reducer
707 GPR resin filler
708 Petrol resistant sealant pasted into groove
709 Thread
710 Threaded flange
712 GTP bonding between sump and fitting Information In Relation To FIG. 10

The mental internal termination fitting is internally crimped to reducer fitting in production.

In the field the complete internal fitting is passed through the hole and the external flange is screwed into position to secure the fitting.

The metal flanges are then bonding to the sump wall using resin and glass fibre mat.

Primary and secondary pipes can then be fused by electrofusion.

The invention claimed is:

1. A fitting for providing a substantially fluid tight seal between an opening in a chamber wall and a pipe assembly, said fitting comprising:
  (i) a first portion comprising a radially extending first flange, a first surface of said first flange being configured to contact the chamber wall around substantially the entire circumference of the first flange, said first flange being formed of a non-plastic material and being adapted to bond to glass reinforced plastic, the first portion being adapted to extend through the opening in the chamber wall, and further comprising a tubular portion extending away from the flange, and a tubular sleeve formed from an electrofusible plastics material, said tubular sleeve being joined in a substantially fluid tight seal to the tubular portion and adapted to couple the fitting to the pipe assembly;
  (ii) a second portion comprising a radially extending second flange, a first surface of said second flange being configured to contact the chamber wall around substantially the entire circumference of the second flange, said second flange being formed of a non-plastic material and being adapted to bond to glass reinforced plastic; and
  (iii) a coupling device adapted to secure the first portion to the second portion.

2. A fitting as claimed in claim 1, wherein the tubular portion and tubular sleeve of the first portion overlap for a proportion of their length, the fluid tight seal between the tubular portion and tubular sleeve being formed in that overlapping region.

3. A fitting as claimed in claim 2, wherein the fitting further comprises an inner tubular portion, formed from a metal, and adapted to fit tightly inside the fitting in the region in which the tubular portion and tubular sleeve overlap.

4. A fitting as claimed in claim 1, wherein the fitting further comprises a sealing device located between the tubular portion and the tubular sleeve, said sealing device being adapted to form a fluid tight seal between the tubular portion and the tubular sleeve.

5. A fitting as claimed in claim 4, wherein the sealing device comprises an O-ring sealed in a circumferential channel around either the tubular portion or the tubular sleeve.

6. A fitting as claimed in claim 5, wherein the fitting further comprises an inner tubular portion, formed from a metal, and adapted to fit tightly inside the fitting in the region in which the tubular portion and tubular sleeve overlap.

7. A fitting as claimed in claim 4, wherein the fitting further comprises an inner tubular portion, formed from a metal, and adapted to fit tightly inside the fitting in the region in which the tubular portion and tubular sleeve overlap.

8. A fitting as claimed in claim 1, wherein the first flange is an integral part of the first portion.

9. A fitting as claimed in claim 1, wherein the first flange is adapted to be secured to the chamber wall by an adhesive.

10. A fitting as claimed in claim 1, wherein the second portion further comprises a second tubular portion or collar extending away from the second flange.

11. A fitting as claimed in claim 1, wherein the second flange is an integral part of the second portion.

12. A fitting as claimed in claim 1, wherein the second flange is adapted to be secured to the second portion by a threaded connection.

13. A fitting as claimed in claim 1, wherein the first flange and first tubular portion are made of a metal.

14. A fitting as claimed in claim 1, wherein the first flange and first tubular portion are made of stainless steel, coated steel, aluminium or coated aluminium.

15. A fitting as claimed in claim 1, wherein the first flange and first tubular portion and the second flange and second tubular portion or collar are formed from substantially the same material.

16. A fitting as claimed in claim 1, wherein the tubular sleeve is formed from polyethylene and the flanges are formed from stainless steel or coated steel.

17. A fitting as claimed in claim 1, wherein the fitting further comprises a cover adapted to cover at least one of said flange(s) and to encapsulate the at least one of said flange(s) in an adhesive.

18. A fitting as claimed in claim 1, wherein the fitting further comprises a test point valve.

19. A fitting as claimed in claim 1, wherein the pipe assembly is a said secondarily contained pipe assembly comprising a primary supply pipe contained within a secondary pipe.

20. A fitting as claimed in claim 1, wherein the said pipe assembly is a primary supply pipe.

21. A fitting as claimed in claim 1, incorporated into an underground pipework system.

22. A fitting for providing a substantially fluid tight seal between an opening in a chamber wall and a pipe assembly, said fitting comprising:
  (i) a first portion comprising a radially surface of said first flange being configured to contact the chamber wall around substantially the entire circumference of the first flange, said first flange being formed of a non-plastic material and being adapted to bond to glass reinforced plastic, the first portion further comprising a tubular portion extending away from the flange, and a tubular sleeve formed from an electrofusible plastics material, said tubular sleeve being joined in a substantially fluid tight seal to the tubular portion and adapted to couple the fitting to the pipe assembly;
  (ii) a second portion comprising a radially extending second flange, a first surface of said second flange being configured to contact the chamber wall around substantially the entire circumference of the second flange, wherein the first flange and first tubular portion and the second flange and second tubular portion or collar are formed from substantially the same material; and
  (iii) a coupling device adapted to secure the first portion to the second portion, wherein the coupling device comprises complementary screw threaded regions on the first and second portions such that the two portions screw together, clamping the chamber wall(s) between the first and second flanges, wherein
the complementary screw threaded regions are located on the outside of the first portion and on the inside of the second portion.

23. A fitting for providing a substantially fluid tight an opening in a chamber wall and a pipe assembly, said fitting comprising:
  (i) a first portion comprising a radially extending first flange, a first surface of said first flange being configured to contact the chamber wall around substantially the entire circumference of the first flange, said first flange being formed of a non-plastic material and being adapted to bond to glass reinforced plastic, the first portion further comprising a tubular portion extending away from the flange, and a tubular sleeve formed from an electrofusible plastics material, said tubular sleeve being joined in a substantially fluid tight seal to the tubular portion and adapted to couple the fitting to the pipe assembly;
  (ii) a second portion comprising a radially extending second flange, a first surface of said second flange being configured to contact the chamber wall around substantially the entire circumference of the second flange, said second flange being formed of a non-plastic material and being adapted to bond to glass reinforced plastic; and
  (iii) a coupling device adapted to secure the first portion to the second portion, further comprising one or more electrofusion couplings, wherein the tubular sleeve is adapted to couple to the pipe assembly by using said electrofusion couplings.

24. A fitting as claimed in claim 23, wherein the electrofusion couplings are expanders or reducers.

25. A fitting for providing a substantially fluid tight seal between an opening in a chamber wall and a pipe assembly, said fitting comprising:
  (i) a first portion comprising a radially extending first flange, a first surface of said first flange being configured to contact the chamber wall around substantially the entire circumference of the first flange, said first flange being adapted to bond to glass reinforced plastic, the first portion further comprising a tubular portion extending away from the flange, and a tubular sleeve formed from an electrofusible plastics material, said tubular sleeve being joined in a substantially fluid tight seal to the tubular portion and adapted to couple the fitting to the pipe assembly, wherein the inner surface of said tubular sleeve incorporates heating windings;
  (ii) a second portion comprising a radially extending second flange, a first surface of said second flange being configured to contact the chamber wall around substantially the entire circumference of the second flange, said second flange being adapted to bond to glass reinforced plastic; and
  (iii) a coupling device adapted to secure the first portion to the second portion.

* * * * *